United States Patent
Wingate et al.

(10) Patent No.: US 10,234,589 B2
(45) Date of Patent: Mar. 19, 2019

(54) SURFACE MARKING TOOL

(71) Applicant: Zircon Corporation, Campbell, CA (US)

(72) Inventors: Barry Wingate, San Jose, CA (US); Chien-Hsu Chen, Millbrae, CA (US)

(73) Assignee: Zircon Corporation, Campbell, CA (US)

( * ) Notice: Subject to any disclaimer, the term of this patent is extended or adjusted under 35 U.S.C. 154(b) by 63 days.

(21) Appl. No.: 14/641,420

(22) Filed: Mar. 8, 2015

(65) Prior Publication Data

US 2016/0077232 A1    Mar. 17, 2016

Related U.S. Application Data

(63) Continuation-in-part of application No. PCT/US2013/078492, filed on Dec. 31, 2013.

(60) Provisional application No. 61/748,421, filed on Jan. 2, 2013, provisional application No. 61/949,637, filed on Mar. 7, 2014.

(51) Int. Cl.
    *G01V 3/15*    (2006.01)

(52) U.S. Cl.
    CPC ..................... *G01V 3/15* (2013.01)

(58) Field of Classification Search
    CPC ........ G01R 11/19; G01R 11/40; G01R 29/16; G01R 29/18
    See application file for complete search history.

(56) References Cited

U.S. PATENT DOCUMENTS

| | | | | |
|---|---|---|---|---|
| 4,260,889 A | * | 4/1981 | Osborn | G01N 23/185 378/61 |
| 6,183,042 B1 | * | 2/2001 | Unrath | E01F 9/662 293/118 |

(Continued)

*Primary Examiner* — Tung X Nguyen
*Assistant Examiner* — Dominic Hawkins
(74) *Attorney, Agent, or Firm* — Omair M. Farooqui; Aziz M. Ahsan; Palo Alto Legal Group, P.C.

(57) ABSTRACT

A surface marking tool, comprising a housing a sensor coupled in the housing to identify a specific location on a surface a marker having a back end and an engaging end, whereby the back end is coupled to the underside of the housing and the engaging end extends beyond the underside of the housing to engage with the target surface; and at least one foot coupled to the underside of the housing. Another aspect of the present invention includes a surface marking tool, comprising a housing, a sensor coupled in the housing to identify a specific location on a surface, a marker having an engaging end, whereby the marker is housed in an open faced cartridge with a back end, whereby the engaging end of the marker extends beyond the cartridge to engage with the target surface, and the back end of the cartridge is coupled to the underside of the housing and extends beyond the underside of the housing, and at least one foot coupled to the underside of the housing. Another aspect of the present invention includes a method of using a surface marking tool, comprising the steps of positioning the surface marking tool against a target surface, using a sensor coupled in the housing to identify a specific location on the target surface, and applying force to the surface marking tool against the target surface, and causing at least one foot to compress and causing a marker housed within the underside of the housing to engage with the target surface and leave a mark.

20 Claims, 18 Drawing Sheets

(56) References Cited

U.S. PATENT DOCUMENTS

| | | | |
|---|---|---|---|
| 7,013,570 B2* | 3/2006 | Levine | G01C 15/004 |
| | | | 200/61.41 |
| 7,036,241 B2* | 5/2006 | Williams | G01B 3/12 |
| | | | 33/772 |
| 7,174,648 B2* | 2/2007 | Long | G01C 15/002 |
| | | | 33/286 |
| 7,928,717 B1* | 4/2011 | Radle | G01R 31/045 |
| | | | 324/509 |
| 2001/0007420 A1* | 7/2001 | Bijawat | G01V 3/15 |
| | | | 324/67 |
| 2001/0034953 A1* | 11/2001 | Cole, III | B43L 9/04 |
| | | | 33/668 |
| 2003/0218469 A1* | 11/2003 | Brazell | G01V 3/15 |
| | | | 324/637 |
| 2004/0070399 A1* | 4/2004 | Olsson | G01V 3/15 |
| | | | 324/326 |

* cited by examiner

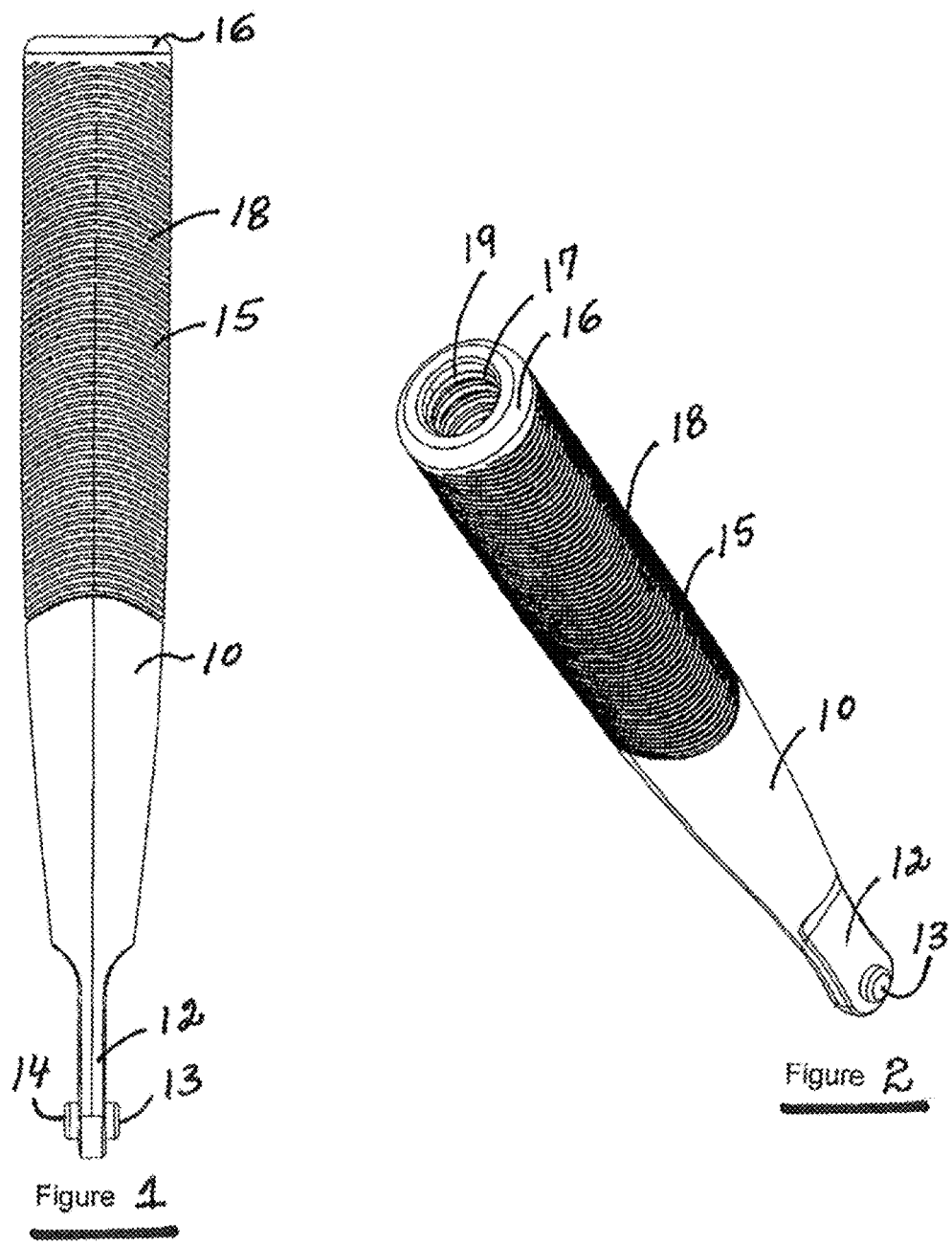

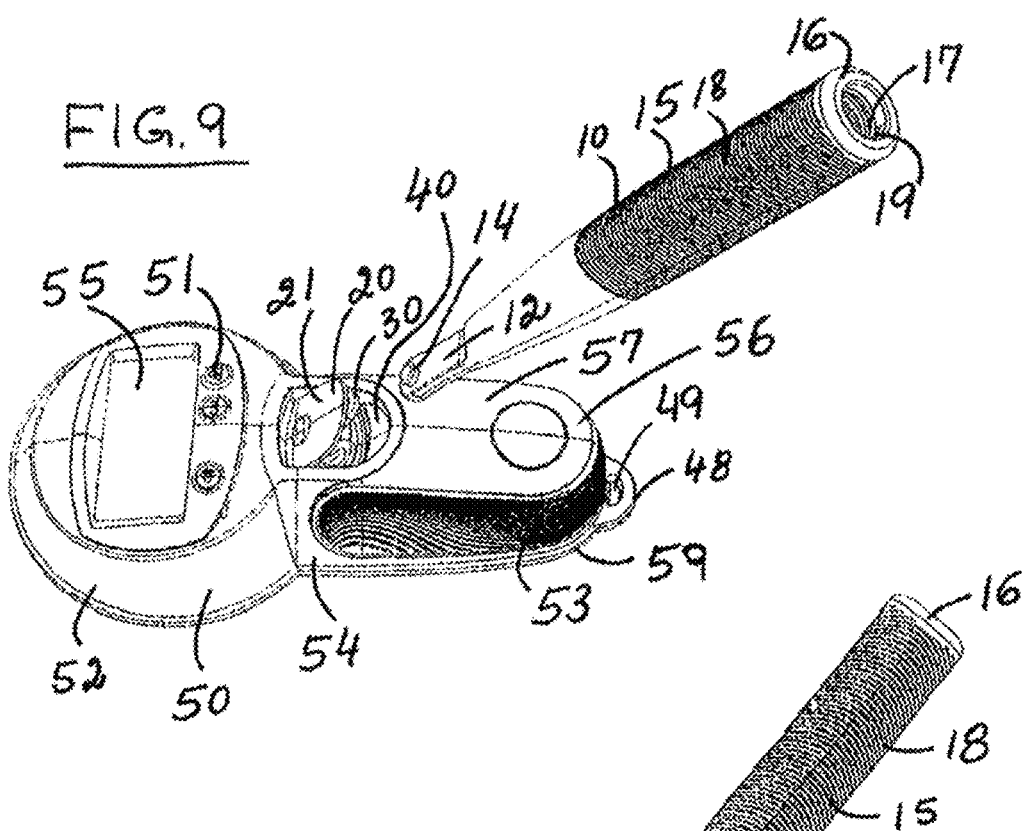
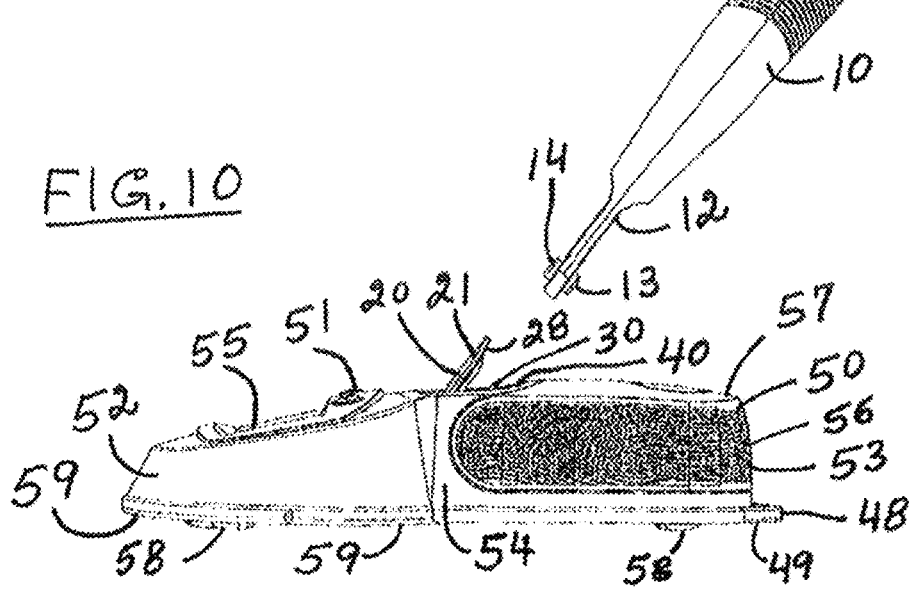

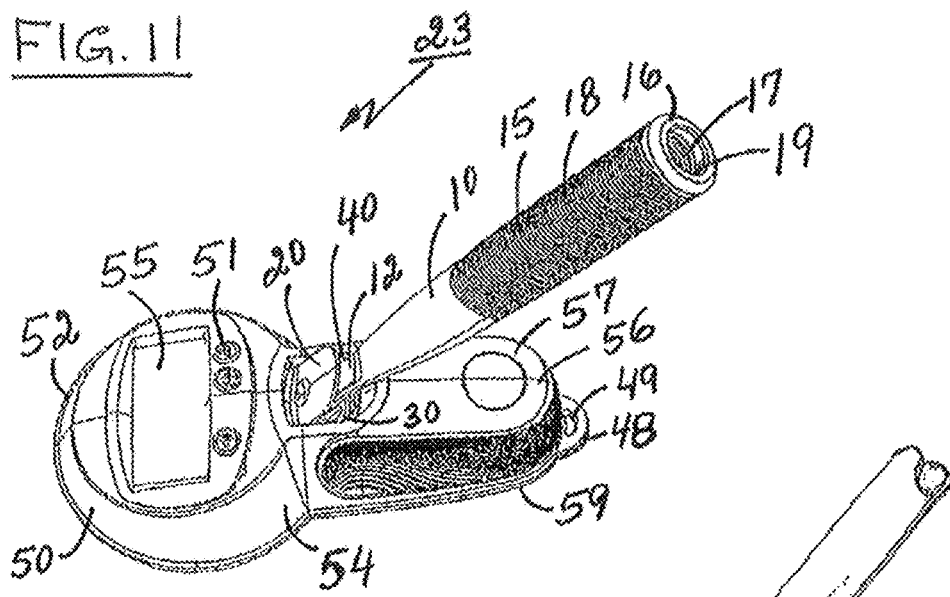
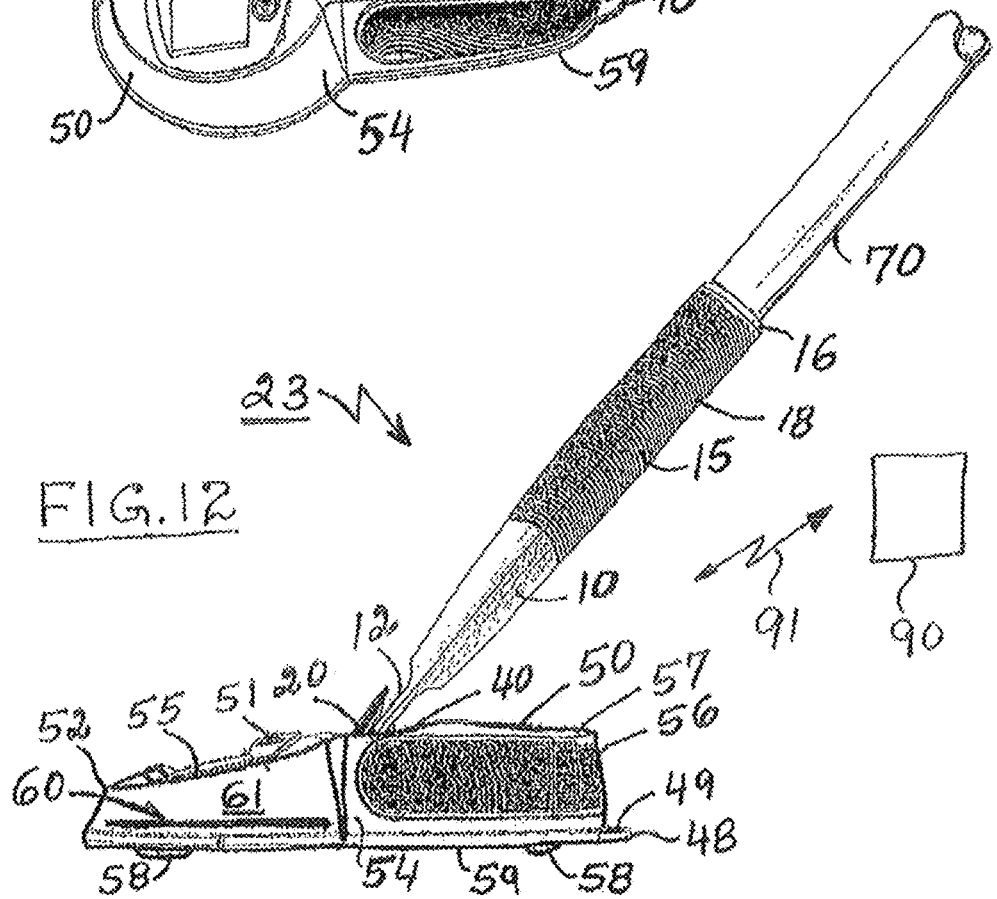

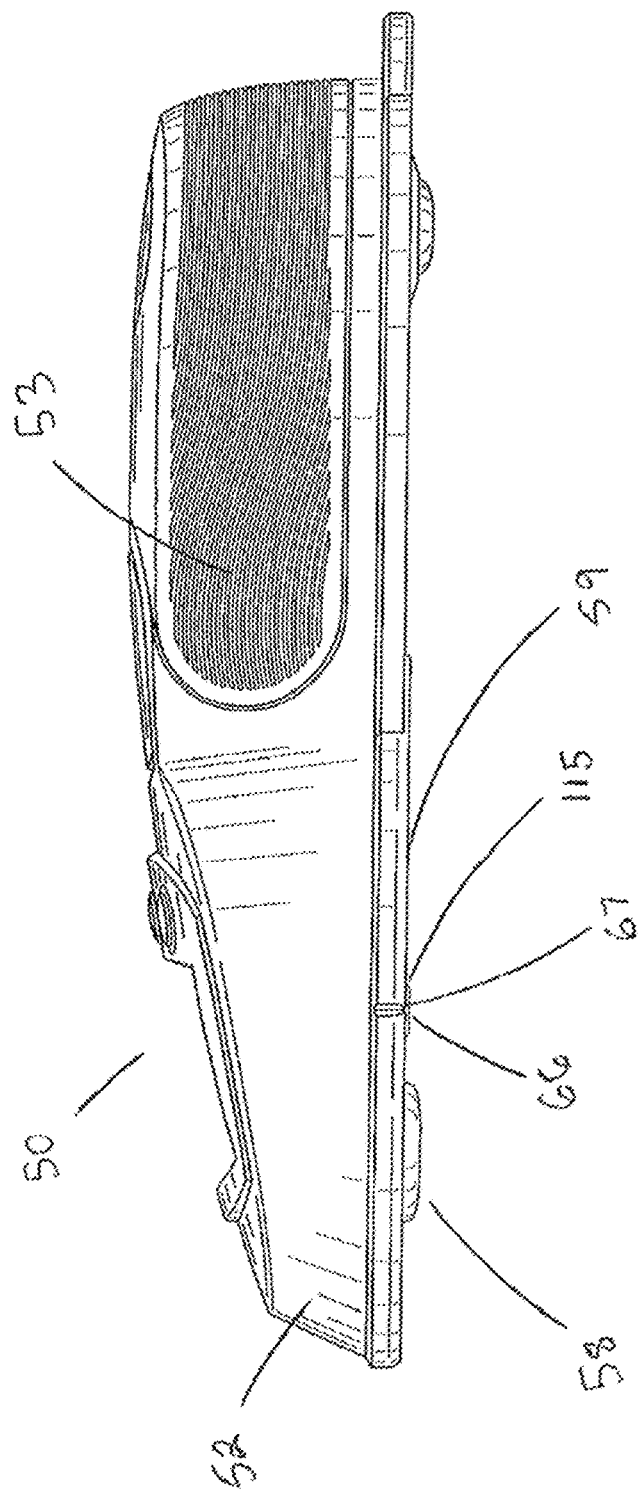

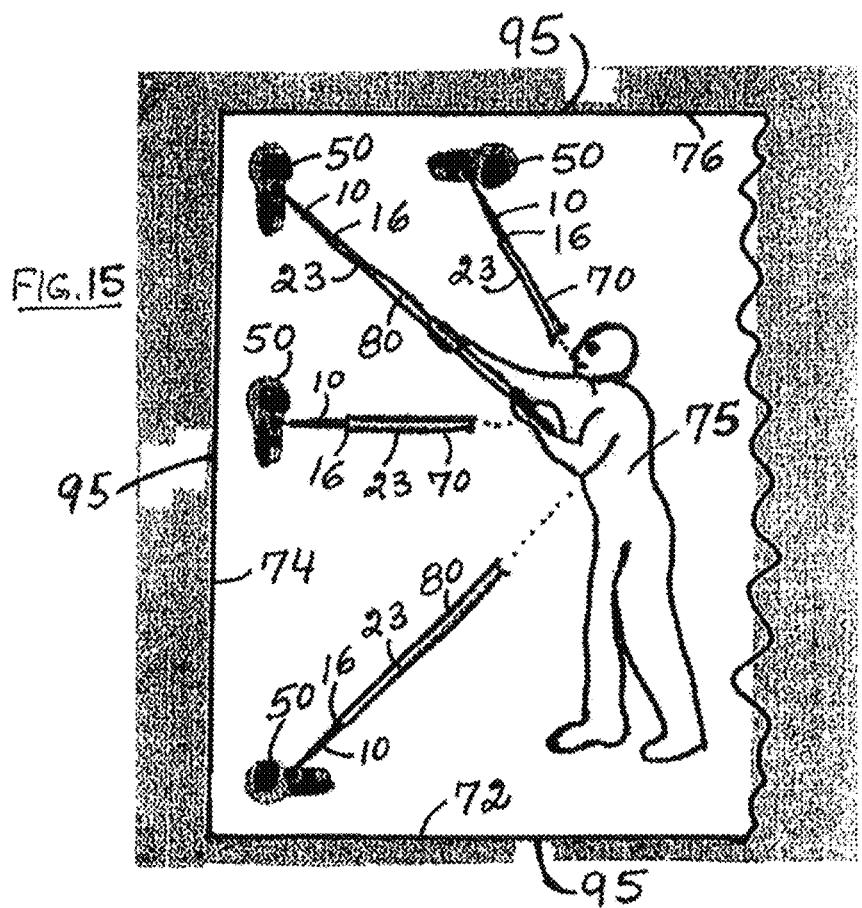
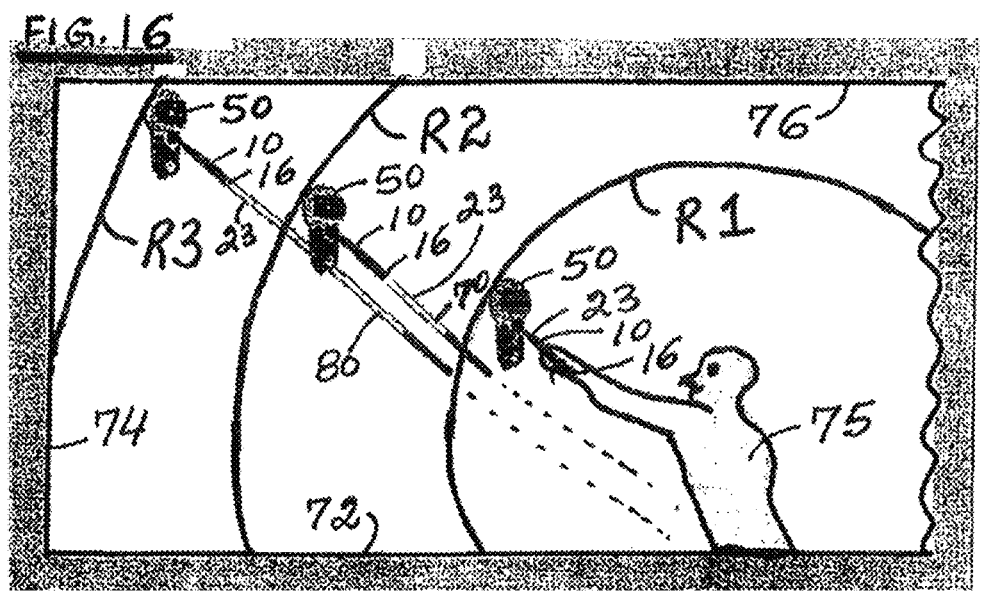

SURFACE MARKING TOOL

CROSS-REFERENCE TO RELATED APPLICATION

The instant patent application claims priority to and the benefit of International Application Serial Number PCT/US13/78492, filed Dec. 31, 2013, titled, "SYSTEM, METHOD, AND APPARATUS, FOR A HANDLE ATTACHMENT FOR A MOBILE DEVICE," which claims priority to and the benefit of U.S. Provisional Patent Application Ser. No. 61/748,421, filed on Jan. 2, 2013, titled "SYSTEM, METHODS AND APPARATUS FOR A HANDLE ATTACHMENT," the entire disclosures of which are incorporated herein by reference. The instant patent application also claims priority to and the benefit of U.S. Provisional Patent Application Ser. No. 61/949,637, filed Mar. 7, 2014, titled, "SYSTEM, METHODS, AND APPARATUS FOR A SURFACE TOOL," the entire disclosure of which is incorporated herein by reference.

FIELD OF THE INVENTION

The present invention relates generally to a system, method, and apparatus for a handle coupled to a device. More specifically, aspects of the present invention relate to a handle releasably coupled to a device. Further still, aspects of the present invention relate to a handle releasably coupled to a clip or hatch that is releasably coupled to a device. Further still, aspects of the present invention relate to a two-axis pivoting handle reliably and releasably coupled to a device. In still other aspects the present invention relates to a device coupled to a releasable handle via a releaseable hatch, and wherein the handle optionally having means for extending the handle. Optionally, the device has an electric device secured thereto, and wherein the electric device has at least one means to communicate with a computer device.

The present invention also relates generally to a surface marking tool.

BACKGROUND INFORMATION

Building tradespersons, such as, carpenters, electricians, cabinet installers, and the like, are often faced with the problem of locating the position of wall studs, including but not limited to metal, wood, and plastic studs, metal objects, wooden objects, heat signatures, electrical wiring, plumbing, and other imbedded or hidden gases, liquids, or solids, behind a surface such as, for example, the installed sheetrock or wallboard forming the wall surface. For example, such walls are usually formed of the wall studs positioned on about 16 inch centers to which are nailed such wall materials as sheetrock or plywood of various thicknesses ranging from about 1/8 inch to about 3/4 inch. After the finishing and painting of the wall, the nails, stud positions, electrical wiring, plumbing and piping, and other imbedded or hidden gases, liquids, and solids, are not visually detectable.

For example, in the case of wall studs, at the present time, a generally used method to locate the position of wall studs includes utilizing a stud finder consisting primarily of a magnet supported in a manner to pivot in the presence of a magnetic material. This finder is moved along the wall surface until it aligns with the head of a nail holding the wallboard on the stud, but relies for its accuracy in locating wood studs on whether or not the person who placed the nail, actually placed it in the center of the stud. This form of stud finder may be housed in a casing and used as a portable sensor.

An additional method to locate the position of wall studs includes utilizing a portable sensor for locating a wall stud positioned behind a wall surface by movement of the sensor along the wall surface comprising in combination, a capacitor plate mounted in the surface closest to the wall surface, a circuit for detecting any change in the capacitance of the capacitor plate due to a change in the dielectric constant of the wall caused by the location of a stud positioned behind the wall surface and immediately adjacent the capacitor, and means for indicating the change in capacitance of the capacitor plate, thereby indicating the wall stud position. This method and apparatus is fully described in U.S. Pat. No. 4,099,118 (Robert C. Franklin, et al.), and is incorporated fully herein by reference.

Thus it can be seen that the above described attempts to locate the wall studs relied upon hand-held devices. This severely limited the use of the stud-sensor to the height and/or arm length of the user. Further, if a user wanted to determine the position of studs beyond his/her physical abilities, such as, for example, a high wall or the ceiling, he/she would have to use a chair or ladder or other device to increase the area of usage. Still further, if a user wanted to determine the position of studs close to the floor or on the floor, he/she would have to get on his/her hands and knees to scan the wall or the floor. Both of the previously above described methods are tedious, time-consuming, and potentially dangerous.

Furthermore, previous attempts to detect the actual location of a solid structural member or a system component for delivering a liquid or gas, electricity or communication signals, positioned or imbedded behind a wall surface, such as, for example, studs, metal objects, heat signatures, electrical wiring, plumbing, and other imbedded or hidden components for transporting/delivering gases, liquids, and/or solids would require the user, once those delivery components or objects are detected by the surface tool, to physically mark the position on the wall with an "X" by hand using a marking instrument such as a pencil or pen. Both hands of the user are occupied as they have to hold a stud sensor in one hand and a marking instrument in the other. This two-hands approach can lead to inaccuracy, is tedious, time-consuming, and potentially dangerous.

This invention improves on the deficiencies of the prior art and provides an inventive system, method, and apparatus, for a handle attachment.

PURPOSES AND SUMMARY OF THE INVENTION

The invention in one aspect is an inventive system, method, and apparatus, for a handle attachment.

Therefore, one purpose of this invention is to releasably couple a handle to a device.

Another purpose of this invention is to provide a handle that is releasably coupled to a hatch that is releasably coupled to a device.

Yet another purpose of this invention is to provide a two-axis pivoting handle reliably, and releasably, coupled to a device.

Still yet another purpose of this invention is to provide a handle releasably coupled to a device, which handle can be telescopically extended to extend the reach of the device from a floor to a ceiling.

Therefore, in one aspect this invention comprises a handle attachment for a mobile device, comprising:

(a) a handle, said handle having a tip end, and a back end, said tip end, having a first tip axle, and a second tip axle, wherein said first tip axle and said second tip axle are on the opposite side of said tip end;

(b) a hatch, said hatch having a first hatch axle, and a second hatch axle, wherein said first hatch axle and said second hatch axle are on the opposite side of said hatch, and wherein said hatch further has an extension, wherein said extension has a first spring engaging means, and a second spring engaging means, and wherein said hatch further has a channel area formed by a first channel wall, and a second channel wall;

(c) a device, said device having a first section, a second section, and a third section, and wherein said second section has a blind hole to releasably and engageably accommodate at least a portion of said hatch; and (d) wherein a portion of said tip end of said handle is inserted into a portion of said hatch such that said first tip axle is releasably and engageably secured by said first channel wall, and said second channel wall, and wherein said second tip axle is releasably and engageably secured by said first spring engaging means and said second spring engaging means, and said hatch is releasably and engageably secured to said device within said blind hole to form said handle attachment for a mobile device.

In another aspect this invention comprises a handle attachment for a mobile device, comprising:

(a) a handle, said handle having a tip end, and a back end, said tip end, having a first tip axle, and a second tip axle, wherein said first tip axle and said second tip axle are on the opposite side of said tip end;

(b) a hatch, said hatch having a first hatch axle, and a second hatch axle, wherein said first hatch axle and said second hatch axle are on the opposite side of said hatch, and wherein said hatch further has an extension, wherein said extension has a first spring engaging means, and a second spring engaging means, and wherein said hatch further has a channel area formed by a first channel wall, and a second channel wall;

(c) a device, said device having a first section, a second section, and a third section, and wherein said second section has a blind hole to releasably and engageably accommodate at least a portion of said hatch;

(d) wherein a portion of said tip end of said handle is inserted into a portion of said hatch such that said first tip axle is releasably and engageably secured by said first channel wall, and said second channel wall, and wherein said second tip axle is releasably and engageably secured by said first spring engaging means and said second spring engaging means, and said hatch is releasably and engageably secured to said device within said blind hole to form said handle attachment for a mobile device; and (e) wherein said device has at least one chamber to accommodate at least one electronic device.

In yet another aspect this invention comprises a handle attachment for a mobile device, comprising:

(a) a handle, said handle having a tip end, and a back end, said tip end, having a first tip axle, and a second tip axle, wherein said first tip axle and said second tip axle are on the opposite side of said tip end;

(b) a hatch, said hatch having a first hatch axle, and a second hatch axle, wherein said first hatch axle and said second hatch axle are on the opposite side of said hatch, and wherein said hatch further has an extension, wherein said extension has a first spring engaging means, and a second spring engaging means, and wherein said hatch further has a channel area formed by a first channel wall, and a second channel wall;

(c) a device, said device having a first section, a second section, and a third section, and wherein said second section has a blind hole to releasably and engageably accommodate at least a portion of said hatch;

(d) wherein a portion of said tip end of said handle is inserted into a portion of said hatch such that said first tip axle is releasably and engageably secured by said first channel wall, and said second channel wall, and wherein said second tip axle is releasably and engageably secured by said first spring engaging means and said second spring engaging means, and said hatch is releasably and engageably secured to said device within said blind hole to form said handle attachment for a mobile device; and (e) wherein said device has at least one chamber to accommodate at least one electronic device, and wherein said at least one electronic device has at least one means to communicate with at least one computer device.

A further exemplary aspect of this invention is an inventive system, method, and apparatus, for a surface tool to leave a mark where the actual location is identified using the inventive components of the inventive device.

An aspect of the present invention includes a surface marking tool, comprising a housing, a sensor coupled in the housing to identify a specific location on a surface, a marker having a back end and an engaging end, whereby the back end is coupled to the underside of the housing and the engaging end extends beyond the underside of the housing to engage with the target surface, and at least one foot coupled to the underside of the housing.

An aspect of the present invention includes a surface marking tool, comprising a housing, a sensor coupled in the housing to identify a specific location on a surface, a marker having an engaging end, whereby the marker is housed in an open faced cartridge with a back end, whereby the engaging end of the marker extends beyond the cartridge to engage with the target surface, and the back end of the cartridge is coupled to the underside of the housing and extends beyond the underside of the housing, and at least one foot coupled to the underside of the housing.

An aspect of the present invention includes a method of using a surface marking tool, comprising the steps of positioning the surface marking tool against a target surface, using a sensor coupled in the housing to identify a specific location on the target surface, and applying force to the surface marking tool against the target surface, and causing at least one foot to compress and causing a marker housed within the underside of the housing to engage with the target surface and leave a mark.

BRIEF DESCRIPTION OF THE DRAWINGS

Although the scope of the present invention is much broader than any particular embodiment, a detailed description of the preferred embodiment follows together with drawings. These drawings are for illustration purposes only and are not drawn to scale. Like numbers represent like features and components in the drawings. The invention may best be understood by reference to the ensuing detailed description in conjunction with the accompanying drawings:

FIG. 1, depicts a side view of an exemplary embodiment of a handle of the present invention.

FIG. 2, depicts a perspective view of an exemplary embodiment of a handle of the present invention.

FIG. 9, depicts a perspective view of an exemplary embodiment of the present invention showing a mobile device.

FIG. 10, depicts a side view of an exemplary embodiment of the present invention of a mobile device.

FIG. 11, depicts a perspective view of an exemplary embodiment of the present invention illustrating the handle mated with a tool via a receiving member.

FIG. 12, depicts a side view of an exemplary embodiment of the present invention illustrating the handle mated with a tool via a receiving member and further having a handle extension.

FIG. 13C, depicts a bottom view of an exemplary embodiment of the present invention.

FIG. 13O depicts a side view of an exemplary embodiment of the present invention.

FIG. 15, depicts usage of an exemplary embodiment of the present invention.

FIG. 16, depicts usage of an exemplary embodiment of the present invention.

Figure 3:
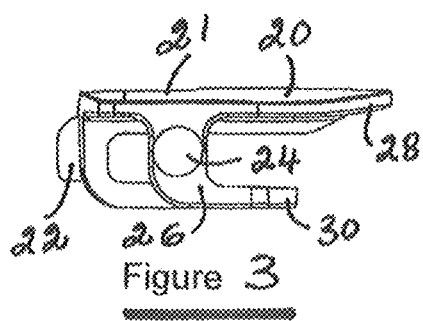
FIG. 3, depicts a side view of an exemplary embodiment of a hatch of the present invention.

The application file contains at least one drawing executed in color. Copies of this patent application publication with color drawing(s) will be provided by the Applicant upon request together with payment of the necessary fee, if any.

DETAILED DESCRIPTION OF THE PRESENT INVENTION

At the outset, it is understood that aspects of the present invention may be implemented with tools, computers, and devices that scan surfaces for imbedded objects, such as, for example, wall studs, including but not limited to metal, wood, and plastic studs, metal objects, wooden objects, heat signatures, electrical wiring, plumbing, and other imbedded solids or hidden components for delivering or transporting gases and/or liquids.

FIG. 1, depicts a side view of an exemplary embodiment of a handle or wand 10, of the present invention. The handle 10, has a tip or tip portion 12, a gripping portion 18, and a back end 16. The tip portion 12, has at least one exemplary axle, or tab, or male portion, or engaging means 13, 14, as shown. The at least one exemplary axle 13, 14, is preferably on the opposite side of the tip portion 12. The gripping portion 18, optionally has at least one gripping means 15, wherein the at least one gripping means 15, is selected from a group comprising a rubber gripping means 15, a rough surface gripping means 15, a series of indentations 15, a series of protrusions 15, and a combination thereof, to name a few. It is preferred that the axle 13, 14, on the tip 12, is symmetrical, so that it is interchangeable when mated with another device/tool.

FIG. 2, depicts a perspective view of an exemplary embodiment of a handle 10, of the present invention. At least one axle 13, 14, is also shown in this exemplary embodiment. The back end 16, preferably has at least one opening or blind hole or cavity or female engaging means 17. The opening 17, preferably has at least one engaging means 19, such as, for example, threads 19. The engaging means 19, can be used to mate another device to the handle 10, such as, an extension pole 70, or a telescopic pole 80, shown in FIGS. 12, 15, 16.

FIG. 3, depicts a side view of an exemplary embodiment of a receiving member 20, of the present invention, here depicted as an exemplary clip or hatch 20. The receiving member 20, or clip 20, or hatch 20, has an upper or top or first surface 21, and a bottom or second surface 28. The second surface 28, has at least one stop or stopper 22, and extension 30. The extension 30, has a side wall or arm 26, having an axle, or tab, or male portion, or engaging means 24, on one side, and a side wall or arm 27, having an axle, or tab, or male portion, or engaging means 25, on the other side, and preferably the opposite side, as more clearly shown in FIGS. 4, 5, and 6.

Figure 4:
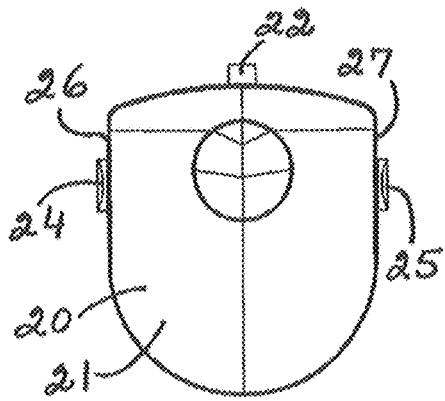
FIG. 4, depicts a top view of an exemplary embodiment of a batch of the present invention.
Figure 5:
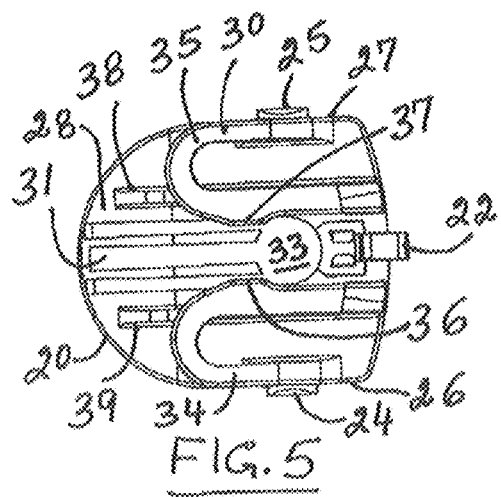
FIG. 5, depicts a bottom view of an exemplary embodiment of a hatch of the present invention.
Figure 6:
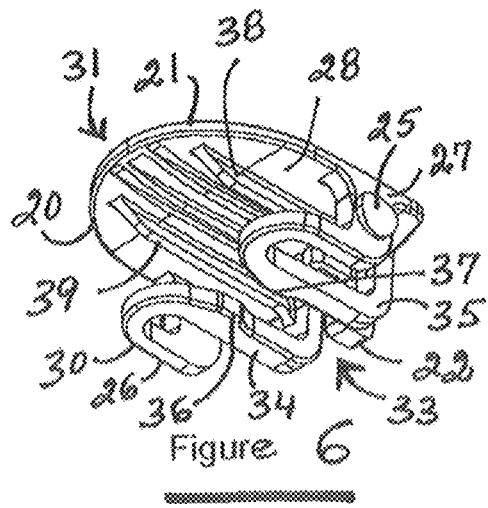
FIG. 6, depicts a bottom perspective view of an exemplary embodiment of a hatch of the present invention.

FIG. 4, depicts a top view of an exemplary embodiment of a receiving member 20, of the present invention, here depicted as an exemplary hatch 20, having a top or upper surface 21, a stop 22, a side wall or arm 26, having an axle, or tab, or male portion, or engaging means 24, on one side, and a side wall or arm 27, having an axle, or tab, or male portion, or engaging means 25, on the other side, and preferably the opposite side, as more clearly shown in FIGS. 4, 5, and 6.

FIG. 5, depicts a bottom view of an exemplary embodiment of a receiving member 20, of the present invention, here shown as an exemplary hatch 20. In the present exemplary embodiment, at least one axle 24, 25, is shown. In one embodiment, at least one end of the axle 24, 25, is convex so that the axle 24, 25, can be dislodged if overstressed to enable the hatch 20, or receiving member 20, to be releaseable. In one embodiment, at least one end of the axle 24, 25, is not convex. The bottom or second surface 28, of the hatch 20, has a leg extension 34, 35, having locking means 36, 37, respectively. The leg extensions 34, 35, along with the locking means 36, 37, form a locking area 33, for the releaseable engagement with the axle 13, 14, of the handle 10, as more clearly shown in FIG. 7. The leg extensions 34, 35, also form the spring arm or spring means 26, 27, respectively. The bottom or second surface 28, also has a channel area 31, which is between a first channel wall 38, and a second channel wall 39.

FIG. 6, depicts a bottom perspective view of an exemplary embodiment of a hatch 20, of the present invention. In the embodiment shown, the exemplary arms 34, 35, of the exemplary hatch 20, are spring loaded to securely hold an exemplary handle 10, as more clearly shown in FIG. 7. In another embodiment, a space 33, between the spring loaded arms 34, 35, permits the axle 13, 14, of the handle 10, to securely rotate along a horizontal axis. The axle 13, 14, of the handle 10, is guided within the channel walls 38, 39, towards the stop 22, and once inside the exemplary hatch 20, the axle 13, 14, is securely, releasably, and engageably, held within the locking area 33, and the locking means 36, 37, as more clearly shown in FIG. 7.

Figure 7:
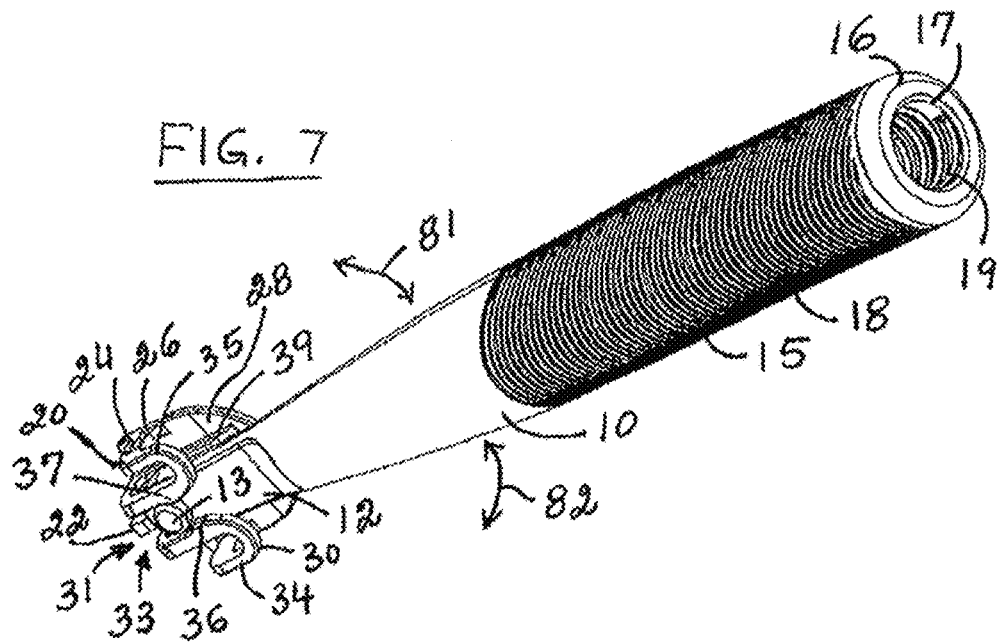
FIG. 7, depicts a bottom perspective view of an exemplary embodiment of a handle of the present invention, as mated with a receiving member of the present invention.
Figure 8:
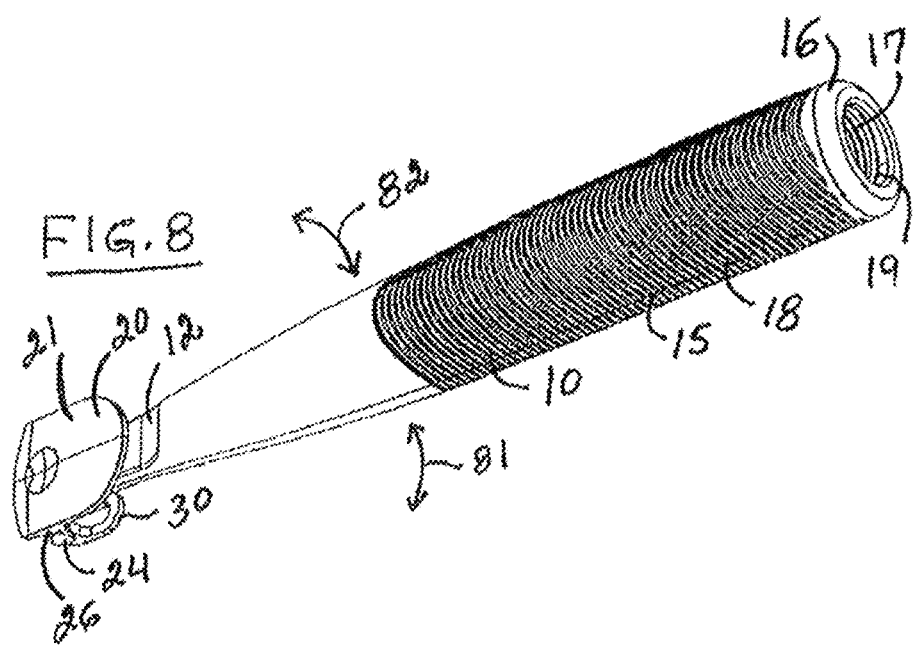
FIG. 8, depicts a top perspective view of an exemplary embodiment of a handle of the present invention.

FIG. 7, depicts a bottom perspective view of an exemplary embodiment of a handle 10, of the present invention, as mated with a receiving member 20, of the present invention, In one embodiment, the exemplary arms 26, 27, of the exemplary hatch 20, are spring-loaded to receive the handle 10. In one embodiment, at least one axle 13, 14, of the exemplary handle 10, fits snugly between the arms 26, 27, of the exemplary hatch 20. The stop 22, prevents the tip 12, from moving forward after the handle 10, has been releasably and engageably mated with the receiving member 20. As shown in FIGS. 7, and 8, the exemplary handle 10, once mated with the receiving member 20, securely rotates along a horizontal axis, or from a left side or a first side to a right side or second side within the receiving member 20, as shown by arrows 81, 82. As one can see that the first axle 13, slides into the hatch 20, and is securely, releasably, and engageably held by the spring loaded members 34, 35, 36, 37, of the extension 30, while the second axle 14, (not shown) is securely, releasably, and engageably held within the channels 38, 39, in the vicinity of the locking area 33.

FIG. 8, depicts a top perspective view of an exemplary embodiment of a handle 10, coupled with an exemplary receiving member 20, here shown as an exemplary hatch 20.

FIG. 9, depicts a perspective view of an exemplary embodiment of the present invention showing a mobile device or tool 50. The mobile device or tool 50, has a front section 52, a mid-section 54, a back or rear section 56, an upper or first section 57, and a lower or second section 59. Preferably, the front section 52, has a display or display area 55, and at least one button, or switch 51. It is preferable that the mid-section 54, has a hatch cavity or a blind hole 40, to accommodate the receiving member 20, along with a portion of the tip 12, having the axle 13, 14. The back or rear section 56, can optionally have an extension 48, having a hole or opening 49. The exemplary handle 10, is shown separated from the exemplary receiving member 20, here shown as an exemplary hatch 20. At least one exemplary axle 13, 14, is also shown on the tip 12, of the handle 10, which is used to mate with the receiving member 20. Optionally, the tool 50, could have at least one anti-skid or gripping means 53, and wherein the at least one gripping means 53, could be selected from a group comprising a rubber gripping means 53, a rough surface gripping means 53, a series of indentations 53, a series of protrusions 53, and a combination thereof, to name a few.

FIG. 10, depicts a side view of an exemplary embodiment of the present invention of a tool or mobile device 50, where the exemplary handle 10, is separated from the exemplary receiving member 20, here shown as an exemplary hatch 20. In this exemplary embodiment at least one axle 13, 14, is shown on the tip 12, of the handle 10, which are about to be coupled or mated with the exemplary receiving member 20. For some applications it would be preferred to have at least one pad 58, on the lower or second surface 59, of the tool 50.

FIG. 11, depicts a perspective view of an exemplary embodiment 23, of the present invention illustrating the handle 10, mated with a tool 50, via a receiving member 20. In the exemplary embodiment shown, an exemplary handle 10, is releasably coupled to an exemplary receiving member 20. In this exemplary embodiment, the exemplary handle 10, is releasably coupled to an exemplary hatch 20. However, in another exemplary embodiment, the exemplary receiving member 20, may not be releasably coupled with the tool 50, and may be fixed. In the present exemplary embodiment, the handle 10, has at least one exemplary axle 13, 14, on the inserting end 12, of the handle 10. In one embodiment the tip 12, of the handle 10, has at least one exemplary axle 13, 14, on the inserting end 12, of the handle 10. In this exemplary embodiment, the tip 12, of the handle 10, is engaged with the receiving portion of the exemplary hatch 20. The exemplary axle 13, 14, of the exemplary handle 10, permits the handle 10, to swing on horizontal axis when coupled with the hatch 20, as more clearly shown with reference to FIGS. 7 and 8.

In the embodiment shown in FIG. 11, the opposite or back end 16, of the exemplary handle 10, that is coupled with the exemplary receiving member 20, the exemplary handle 10, is designed to receive at least one further extension 70, 80, as shown in FIGS. 12, 15, 16, which will enable a user 75, to further extend the zone of operation of the tool 50. In an embodiment, the exemplary handle 10, may be wholly or partially tubular in nature to receive the further extending member 70, 80. In an embodiment, the exemplary handle 10, may also be threaded 19, to enable a more reliable coupling with an extending member 70, 80. In another embodiment, the exemplary handle 10, may be designed to receive a smaller tubular extending member 70, 80, which is inserted into the exemplary handle 10. In another embodiment, the exemplary extending member 70, 80, may also be designed to further receive additional extending members 70, 80. In another exemplary embodiment, the extending members 70, 80, may be collapsible tubular inserts 70, 80, which may be pulled in and out to achieve a desired length. In another exemplary embodiment the extending members 70, 80, may be telescopic extending members 70, 80.

FIG. 12, depicts a side view of an exemplary embodiment 23, of the present invention illustrating the handle 10, mated with a tool 50, via a receiving member 20, and further having a handle extension 70. The tool 50, could be provided with an electronic device 60, within a cavity or chamber 61.

The electronic device 60, would preferably be able to communicate with another electronic device 60, or a computer 90, or a server 90, preferably using a medium 91, such as, a wired medium 91, or a wireless medium 91. It should be understood that the second device 60, could be a computer 90, and may be located at a different location 90. In the exemplary embodiment shown, an exemplary handle 10, is coupled to an exemplary receiving member 20. In this exemplary embodiment, the exemplary handle 10, is releasably coupled to an exemplary hatch 20. The exemplary hatch 20, is releasably coupled to an exemplary tool 50. In one exemplary embodiment, the handle 10, may be made of plastic or any other substance that would not interfere with any type of sensor 60, associated with the tool 50, and contained within a cavity or chamber 61, within the tool 50. In one exemplary embodiment, the handle 10, is designed to receive a further extension 70, 80, as described in FIGS. 12, 15, 16. In one exemplary embodiment, the handle 10, may be made of a substance to prevent a further extension from interfering with any sensor 60, associated with the tool 50. Such as, for example, if the exemplary extension 70, 80, is made of metal, or any other material that may interfere with any sensor 60, of the tool 50, the exemplary handle 10, would act as a buffer to avoid or reduce such potential interference. In one exemplary embodiment, the exemplary handle 10, would reduce the chances of, or prevent, any false readings or measurements of the tool or mobile device or sensing device 50, due to interference.

Figure 13:
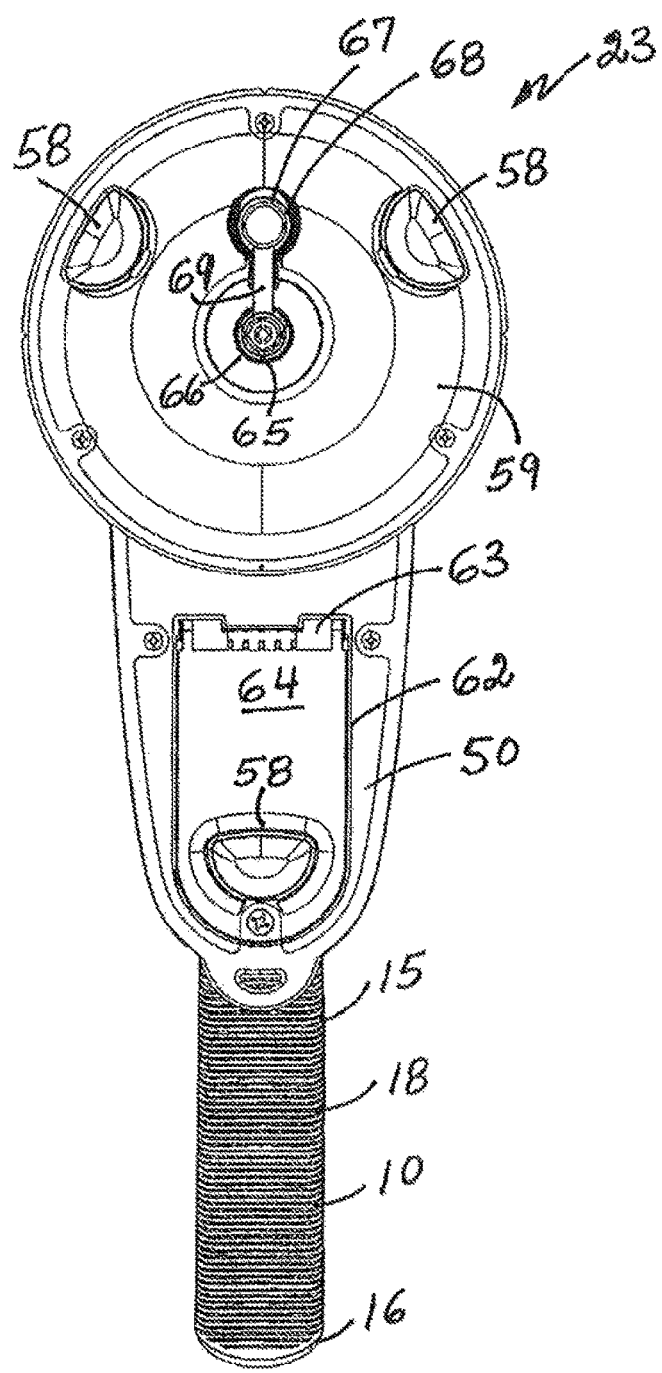
FIG. 13, depicts a bottom view of an exemplary embodiment of the present invention.

FIG. 13, depicts a bottom view of an exemplary embodiment 23, of the present invention. As one can see that the bottom surface 59, has at least one optional pad 58, which optional pad 58, would allow the tool 50, to smoothly glide over a surface where the tool 50, is being used. For some applications the tool 50, could have a battery compartment 62, where a cover 64, would securely contain a battery (not shown) inside the battery compartment 62. The cover 64, could have a hinge or a securing means or tabs 63, to allow the secure opening and closing of the battery compartment 62, using the cover 64. For some applications the lower or bottom surface 59, of the tool 50, could have an ink reservoir or marking means 66, contained inside a cavity or chamber or blind hole 65. When not in use, the ink reservoir 66, could be protected via a cap or cover 68. Optionally, the cap 68, could be provided with a strap 69, whose one end could be secured to the cap 68, and the opposite end could be secured to a portion of the surface 59, such as, an area around the ink reservoir 66. For some applications the bottom surface 59, could be provided with a cap or cover area 67, for the secure placement of the cap or cover 68, while the ink or marking means 66, was being used. The ink or marking means 66, would preferably be used to mark a spot on a surface, as desired by the user 75.

Figure 13A:
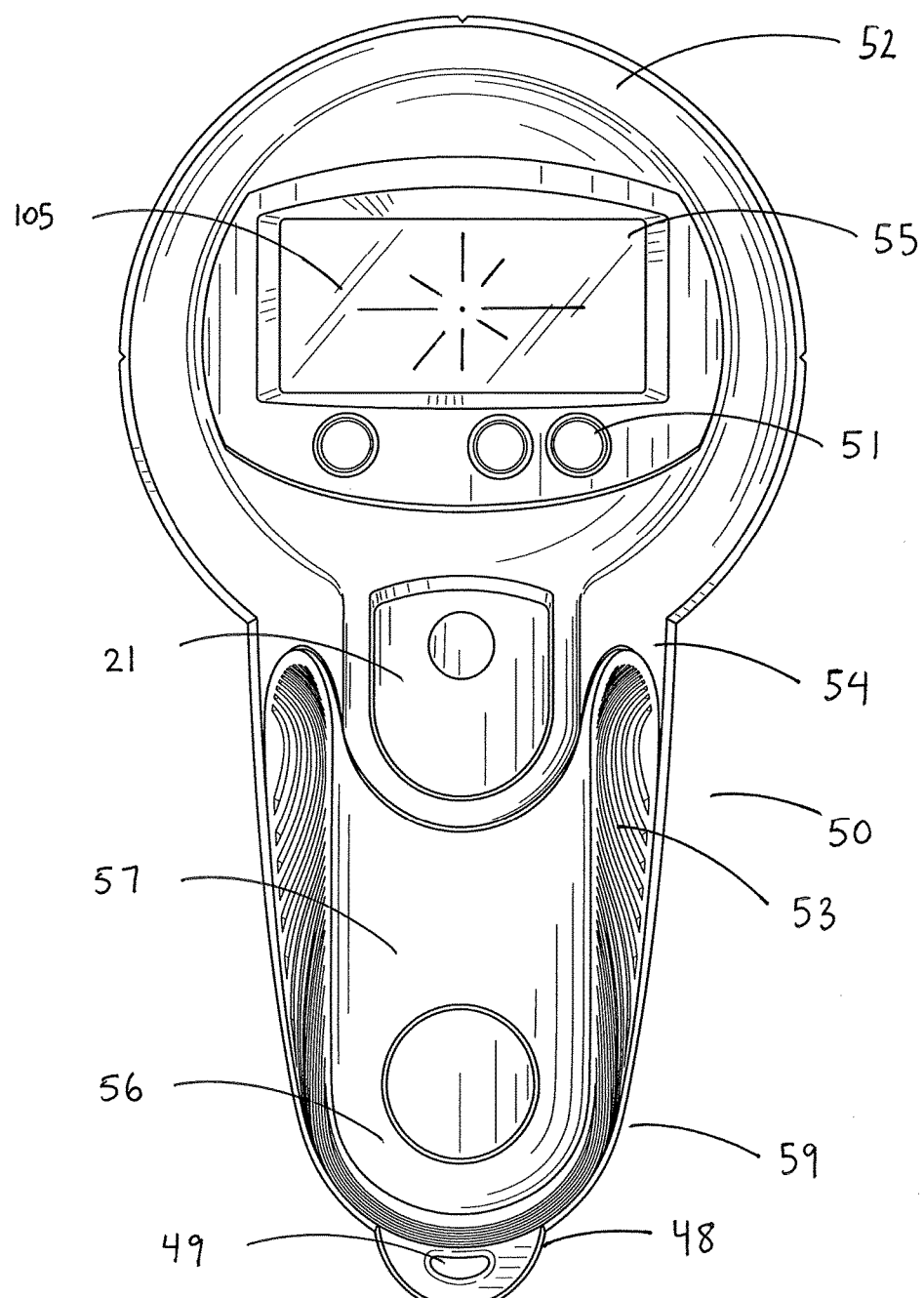
FIG. 13A, depicts a top view of an exemplary embodiment of the present invention.

FIG. 13A depicts a top view of a surface tool of an exemplary embodiment of the present invention. In the exemplary embodiment shown, surface tool 50 utilizes a portable sensor (not shown in this view) to detect the actual location of an imbedded solids or hidden components for delivering or transporting gases and/or liquids such as, for example, a stud, metal objects, heat signatures, electrical wiring, plumbing, and other imbedded solids or hidden components for delivering or transporting gases and/or liquids positioned behind a wall surface by movement of the sensor along the wall surface. The portable sensor includes in combination, a capacitor plate (not shown in this view) mounted in the surface closest to the wall surface, a circuit (not shown in this view) for detecting any change in the capacitance of the capacitor plate due to a change in the dielectric constant of the wall caused by the location of a stud positioned behind the wall surface and immediately adjacent the capacitor, and means for indicating the change in capacitance of the capacitor plate, thereby indicating the wall stud position. In another exemplary embodiment, magnets or any other means or technologies may be used to detect the actual location of imbedded solids or hidden components for delivering or transporting gases and/or liquids, such as, for example, a stud, or to avoid metal objects, heat signatures, electrical wiring, plumbing, and other imbedded solids or hidden components for delivering or transporting gases and/or liquids.

In an exemplary embodiment, as shown in FIG. 13A, the means for indicating the change in capacitance of the capacitor plate is display screen 55. In one embodiment display screen 55 is an LED screen, however any screen or technology may be used that enables the user to see the information on display screen 55. In one embodiment, once the exact location of the imbedded solids or hidden components for delivering or transporting gases and/or liquids being sought is identified, display screen 55 will flash a visual graphic 105 such as, for example, a star, or an "X" or any other symbol to indicate to the user that the actual position has been identified. Once the actual location behind the target surface has been identified, the user presses the surface tool 50, or applies additional force against the wall surface. In one embodiment, surface tool 50 further includes a pre-inked marker (not shown in FIG. 1) housed within underside/bottom surface 59 of surface tool 50, and extending beyond underside/bottom surface 59. In one embodiment, marker (not shown in FIG. 1) is not pre-inked and may be required to be filled with ink separately. In one exemplary embodiment, to leave a mark, the user applies force against a target surface using the surface tool 50, by gripping firmly the gripping means 53. After the surface tool 50 is removed from the target surface, a visual mark 110 (FIG. 13B) which has the same pattern with the cross section of the pre-inked maker (not shown in FIG. 13A) is left behind.

Figure 13B:
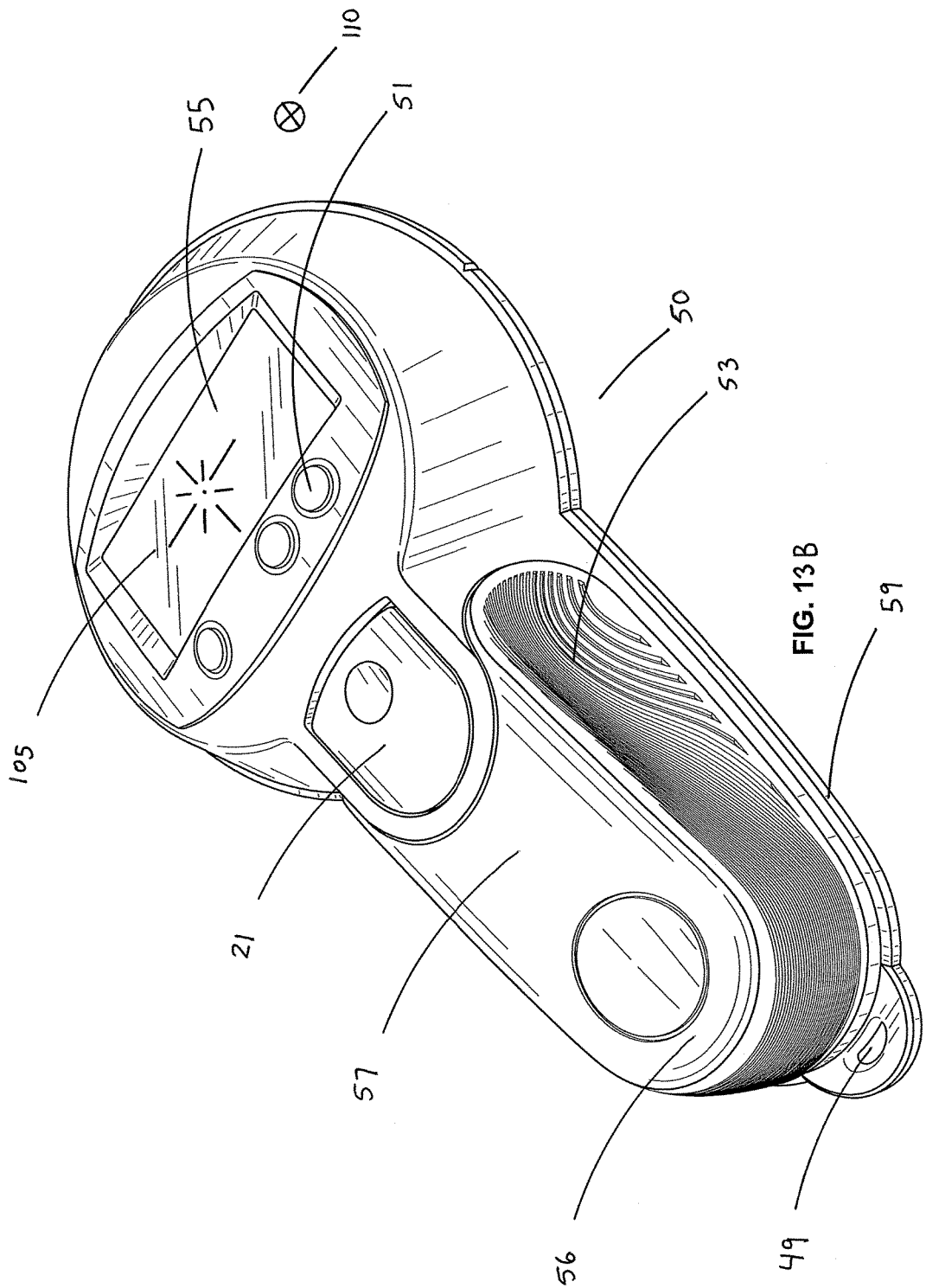
FIG. 13B, depicts a perspective view of an exemplary embodiment of the present invention, where an exemplary embodiment of a visual mark is shown.
Figure 13:
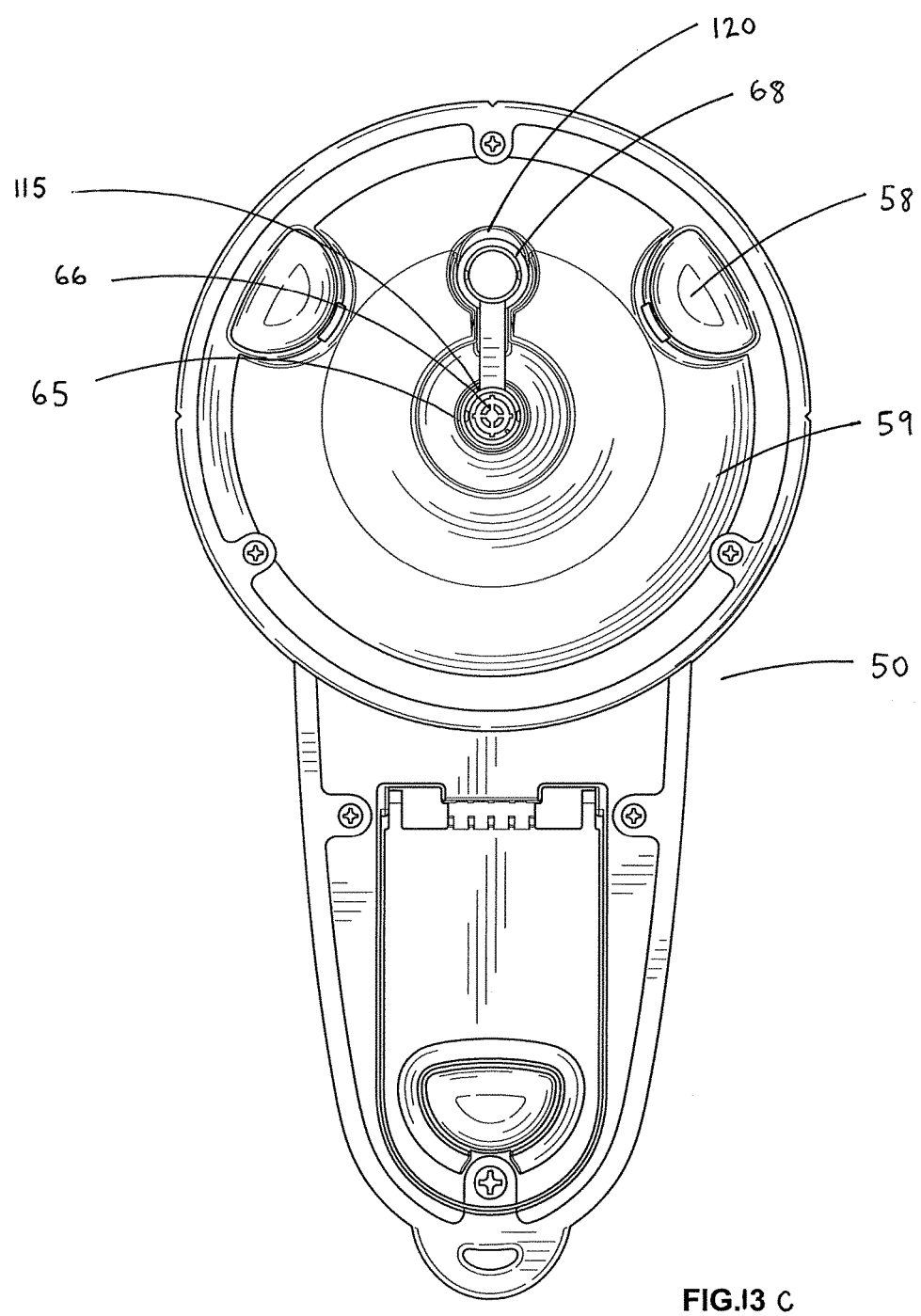

FIG. 13B depicts a top-perspective view of a visual mark 110 left behind after surface tool 50 is pressed against a target surface and is removed from the target surface. In the exemplary embodiment, visual mark 110 is an "X" with a circle around it, however, any visual mark or impression may be employed. In this situation, the pattern of the visual mark 110 left on the target surface (FIG. 13B) corresponds to the cross section of marker 66 (FIG. 13C). Any visual mark or impression may be employed to the cross section of marker 66.

FIG. 13C depicts an exemplary embodiment of the present invention where marker 66 is removably housed within cavity 65, underside bottom surface 59 of surface tool 50. In one embodiment, marker 66 may be removably housed in cartridge 115 and cartridge 115 may be removably housed in cavity 65. Alternatively, in another embodiment, marker 66 may be fixed within cartridge 115, and cartridge 115 may be removably housed in cavity 65. Marker 66 or cartridge 115 may be adjusted so that marker 66 extends beyond underside/bottom surface 59 of surface tool 50 and engages with the target surface. In another embodiment, marker 66 may come pre-adjusted in cartridge 115 so that marker 66 extends beyond underside/bottom surface 59 of surface tool 50 and engages with the surface of the target to be marked. In one exemplary embodiment, marker 66 or cartridge 115 may have a marker cap 68. In the ready-use position, marker cap 68 may be removably coupled within cap cavity 120 so that it does not protrude beyond underside 59.

Figure 13D:
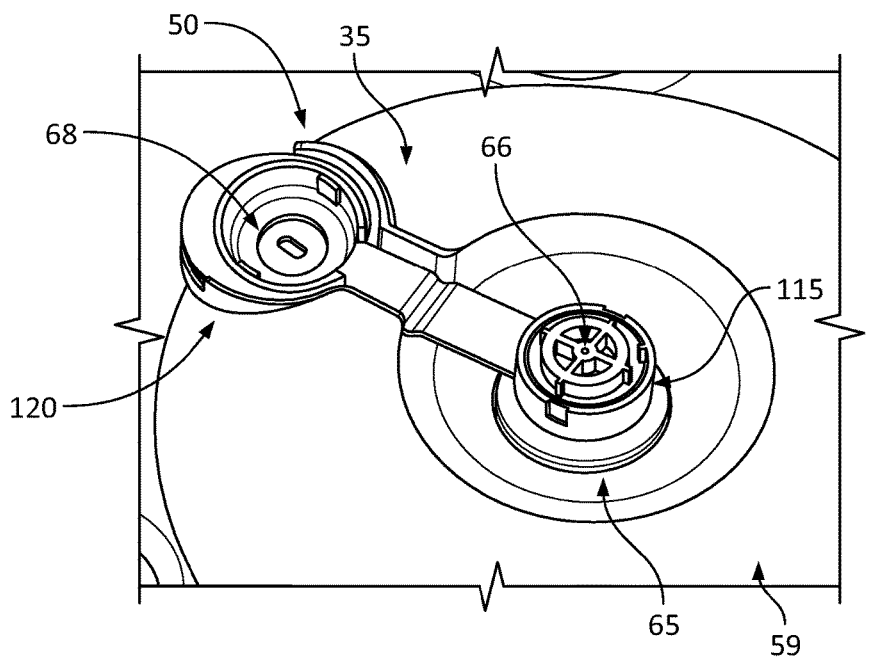
FIG. 13D depicts a bottom perspective view of an exemplary embodiment of a marker in open ready position to mark a target surface.

FIG. 13D depicts an exemplary embodiment of the present invention where marker 66 is removably housed within underside 59 (FIG. 13C) of surface tool 50. Marker 66 may be removably housed in cavity 65 and adjusted so that marker 66 extends beyond underside 59 of surface tool 50 and engages with the target surface. In one embodiment, marker 66 may be removably housed within cartridge 115. In one embodiment marker 66 may be fixed in cavity 65. In one exemplary embodiment, marker 66 may be fixed in cartridge 115. In one embodiment, marker 66 protrudes beyond cartridge 115 and cartridge 115 extends beyond underside 59 of surface tool 50 and engages with the target surface. In one exemplary embodiment, marker 66 may have a marker cap 68. In the ready-use position, marker cap 68 may be removably coupled within cap cavity 120 so that it does not protrude beyond underside 35. In one exemplary embodiment, in the ready-use position, marker cap 68 may be removably coupled within cap cavity 120 so that it does not protrude beyond the engaging end of marker 66.

In another exemplary embodiment, underside 59 of surface tool 50 does not have a cavity 65, and marker 66 is removably coupled to underside 59 of surface tool 50, so that marker 66 extends beyond underside 59 and engages with the target surface to be marked. In another exemplary embodiment, underside 59 of surface tool 50 does not have a cavity 65, and marker 66 is removably housed in cartridge 115, and cartridge 115 is removably coupled to underside 59 of surface tool 50 so that marker 66 extends beyond underside 59 and engages with the target surface to be marked.

In another exemplary embodiment, marker 66 may be fixed directly to underside 59 and marker 66 is itself compressible and is made of compressible material. In one embodiment, the marker 66 may be coupled to underside 59 via a spring mechanism or any other compressible medium that enables compression. In another embodiment, marker 66 may be coupled to underside 59 via a substrate that permits compression.

Figure 13E:
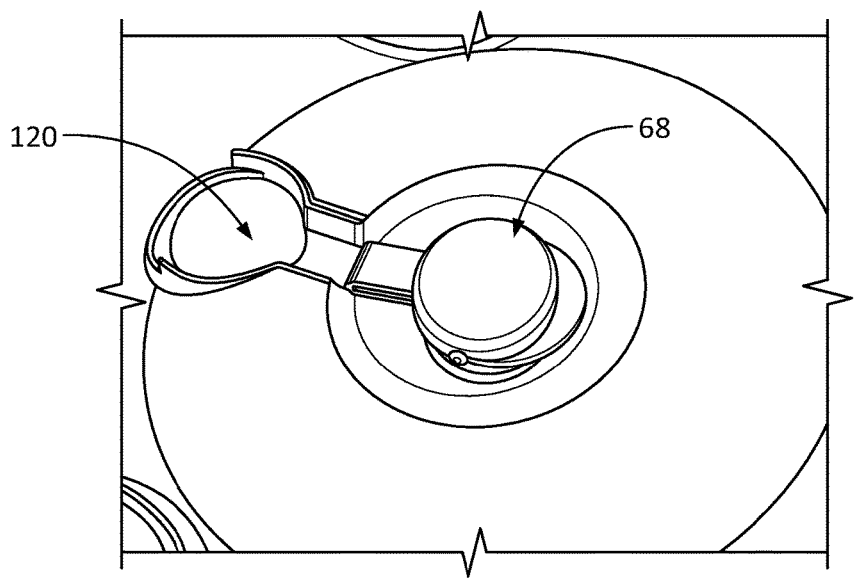
FIG. 13E depicts a bottom perspective view of an exemplary embodiment of a marker in a closed position.

FIG. 13E depicts an exemplary marker 66 in a closed position (not shown), with marker cap 68 releasably secured to marker 66 of an exemplary embodiment of the present invention when no marks are required or work is finished. FIG. 13.5 also clearly depicts cap cavity 120.

Figure 13F:
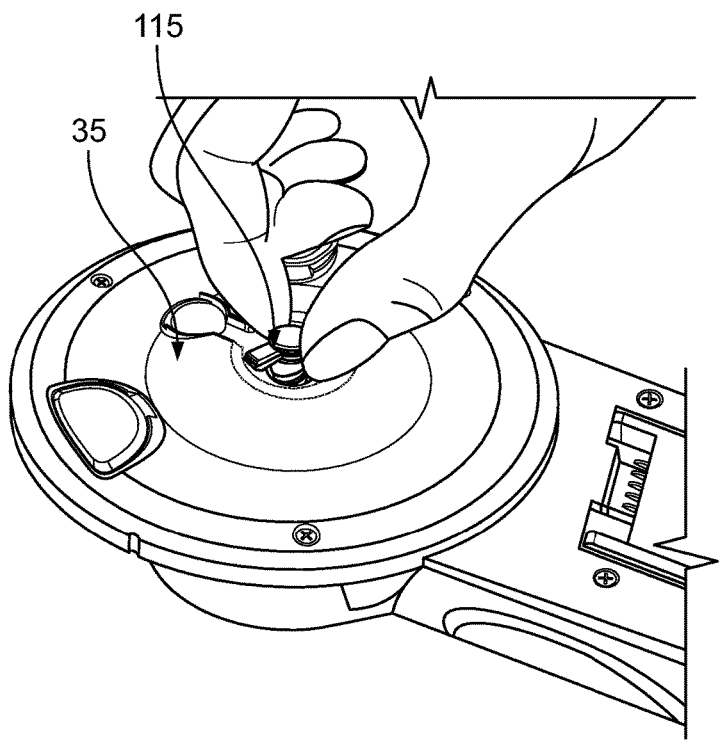
FIG. 13F depicts a bottom perspective view of an exemplary embodiment of the present invention, whereby a user is removing an exemplary embodiment of a marker cartridge from an exemplary embodiment of the present invention.

FIG. 13F depicts an exemplary embodiment of the present invention where a user is removing marker cartridge 115. In one embodiment, the user rotates marker cartridge 115 clockwise 180 degrees. However, marker cartridge may be removably coupled to the underside 59 of surface tool 50 in any reasonable manner.

Figure 13G:
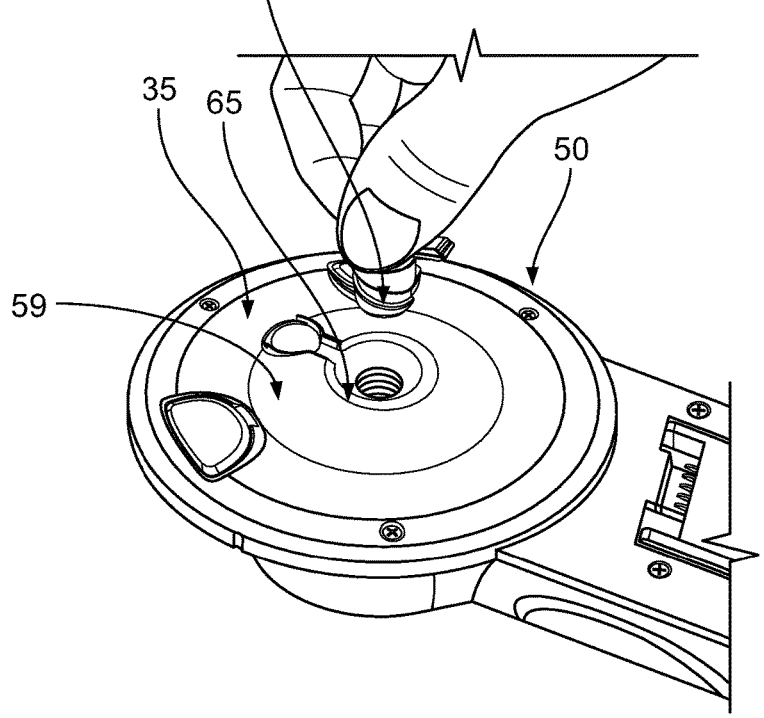
FIG. 13G depicts a bottom perspective view of an example of a user inserting an exemplary embodiment of a new marker cartridge into an exemplary cavity of an exemplary embodiment of the present invention.

FIG. 13G depicts a user inserting a new exemplary marker cartridge 115 into cavity 65 of underside 59 of surface tool 50 of an exemplary embodiment of the present invention. In one embodiment, cavity 65 matches the external contour of marker cartridge 115. In another embodiment, where marker cartridge is directly coupled to a cavity within underside 59 of surface tool 50, cavity 65 matches the external contour of marker 66.

Figure 13H:
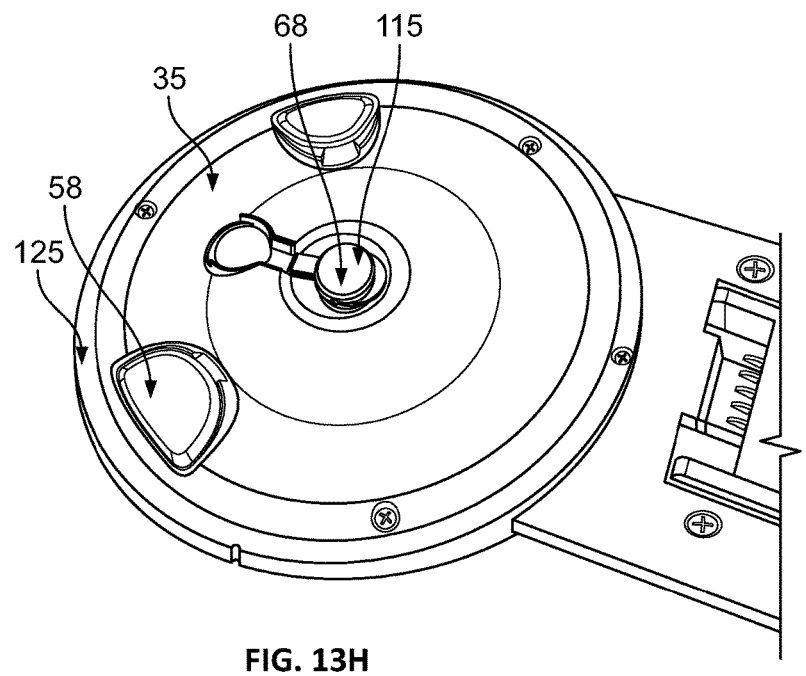
FIG. 13H depicts a bottom perspective view of an exemplary embodiment of a marker cartridge in a closed position.

FIG. 13H depicts an exemplary embodiment of a marker cartridge 115 with its cap 68 closed. In one embodiment, surface tool 50 may have one or more feet 58. In one exemplary embodiment feet 58 are housed within feet cavity 125 and extend beyond the tip of marker 66. However feet 58 are compressible so that when force is applied to tool 50 against the target surface, feet 58 succumb to the force and permit marker 66 to engage with the target surface and leave a mark 110, as described above. In one embodiment, feet 58 are coupled to a spring mechanism that enables compression. In another embodiment, feet 58 are coupled to a substrate that permits compression. In another embodiment, feet 58 themselves are made of a compressible material, such as, for example, foam or rubber.

Figure 13I:
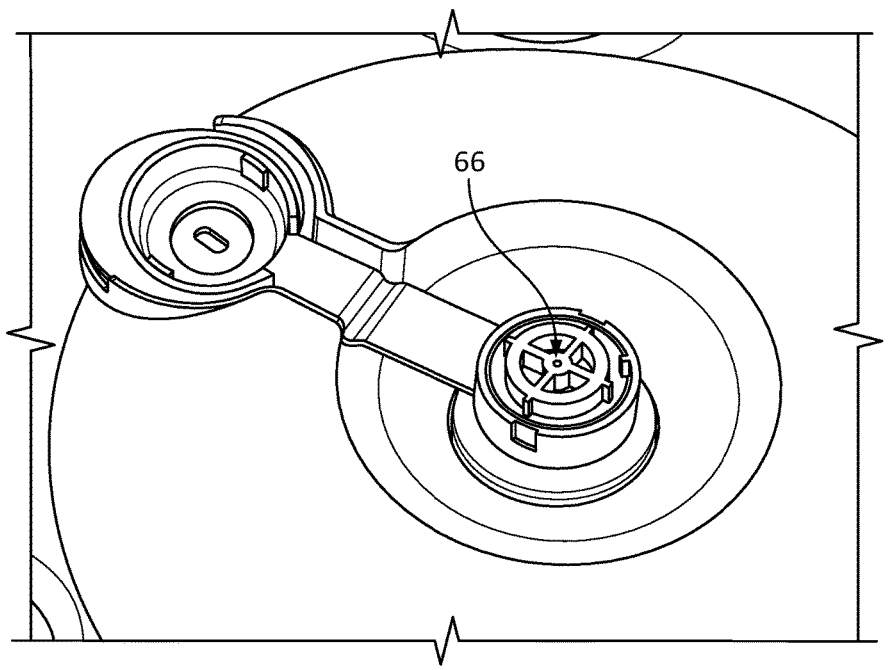
FIG. 13I depicts a bottom perspective view of an exemplary embodiment of a colored blue marker of an exemplary embodiment of the present invention.
Figure 13J:
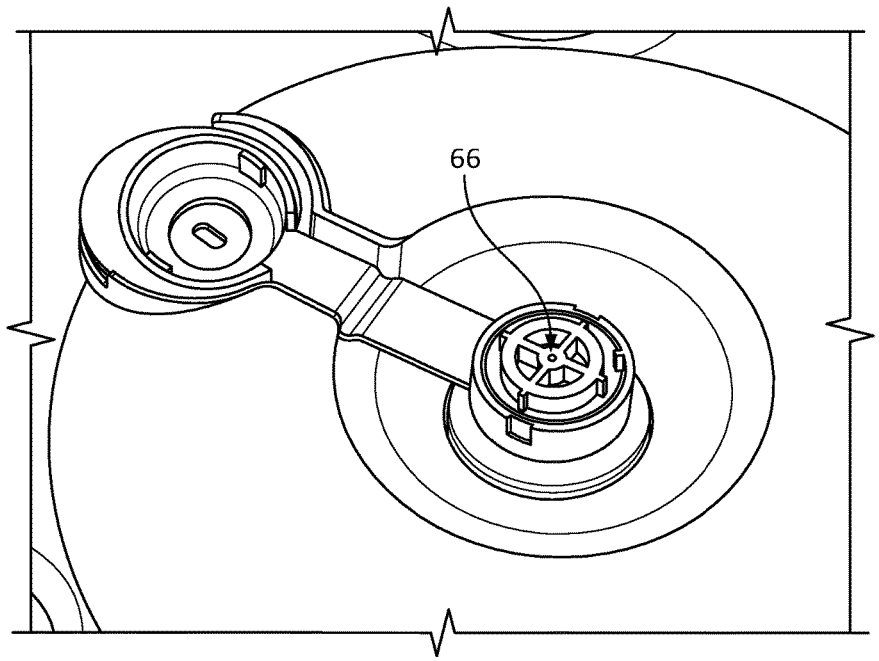
FIG. 13J depicts a bottom perspective view of an exemplary embodiment of a colored red marker of an exemplary embodiment of the present invention.
Figure 13K:
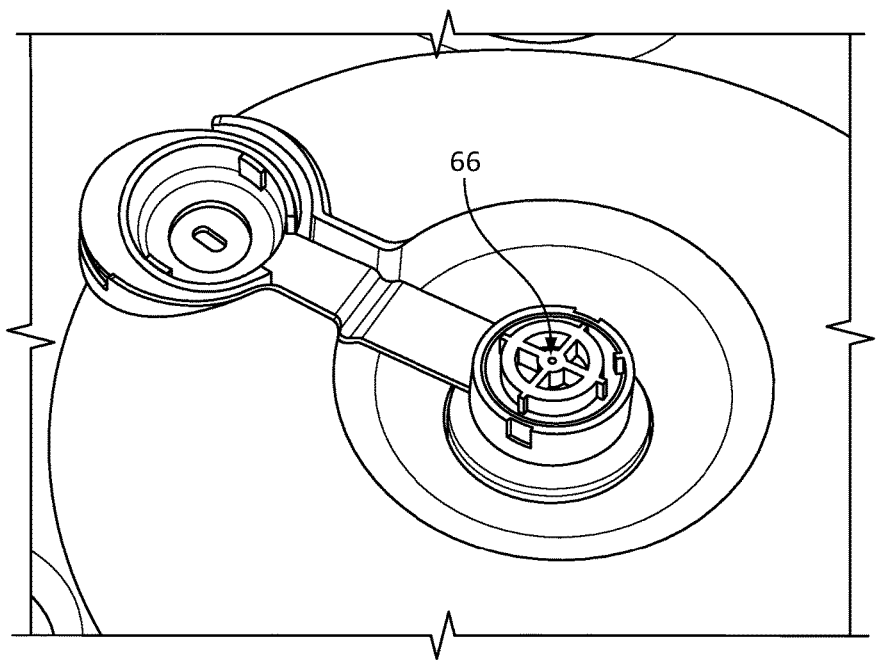
FIG. 13K depicts a bottom perspective view of an exemplary embodiment of a colored green marker of an exemplary embodiment of the present invention.

FIGS. 13I, 13J, and 13K depict marker 66, in different colors of exemplary embodiments of the present invention. In order to be applied to different scenarios, specifically, to be applied to walls with different colors, markers with different pre-inked colors may be needed. As shown in FIGS. 13I, 13J, and 13K, the pre-inked colors of the marker 66 are blue, red, and green respectively. Besides the colors shown in the figures of the present application, marks 110 may be in any other color imaginable, so long as the mark left behind could be distinguished from the target wall and recognized by users or other tools and instruments. In another embodiment, marker 66 is not pre-inked and would require the user to add his/her own ink or marking material or liquid, which may or may not be sold separately with tool 50.

Figure 13L:
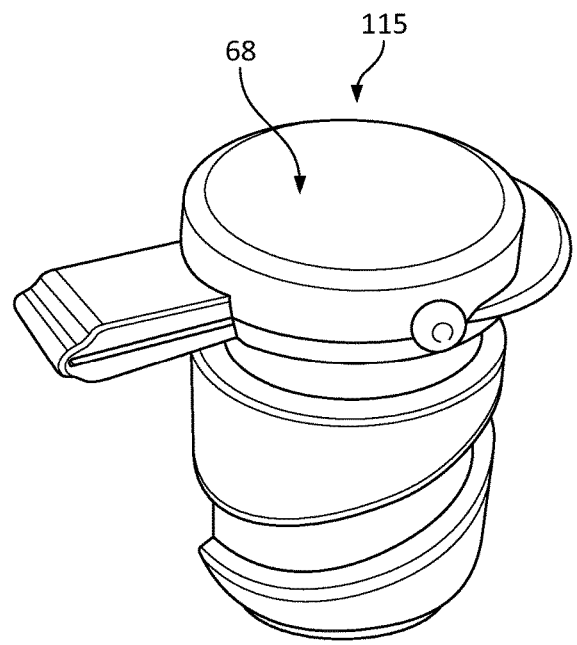
FIG. 13L depicts a perspective view of an exemplary embodiment of a marker cartridge with its cap closed.

FIG. 13L depicts an exemplary embodiment of a marker cartridge 115, with its cap 68 closed. In this exemplary embodiment, cartridge 115 is shown with an internal thread to removably engage with cavity 65. In another embodiment, cartridge 115 may have external threads to removably engage with cavity 65. In one embodiment, cartridge 114 couples to the underside 59 of tool 50 in a direct and reversible method, quickly attached and detached by means of a half turn thread, 180° rotation.

Figure 13M:
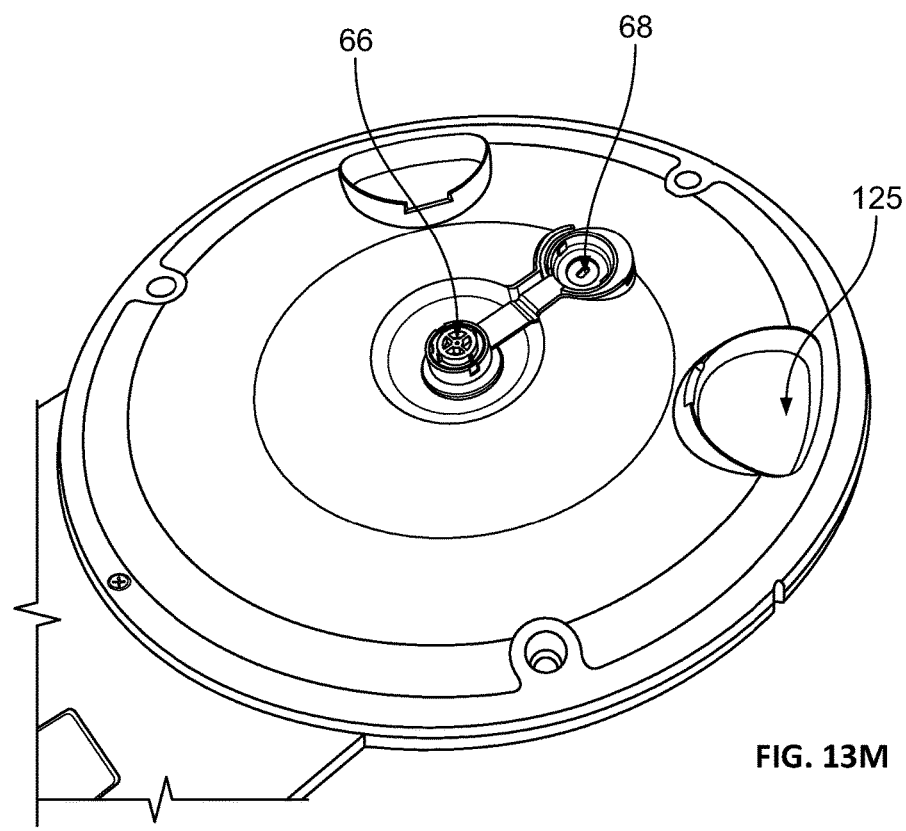
FIG. 13M depicts a bottom perspective view of an exemplary marker with its marker cap in the open position of an exemplary embodiment of the present invention.

FIG. 13M depicts marker 66 with marker cap 68 in the open position of an exemplary embodiment of the present invention. In this figure, feet 58 have been removed, exposing feet cavity 125. In one embodiment, where there is no feet cavity 125, feet 58 are coupled to underside 59 of surface tool 50.

Figure 13N:
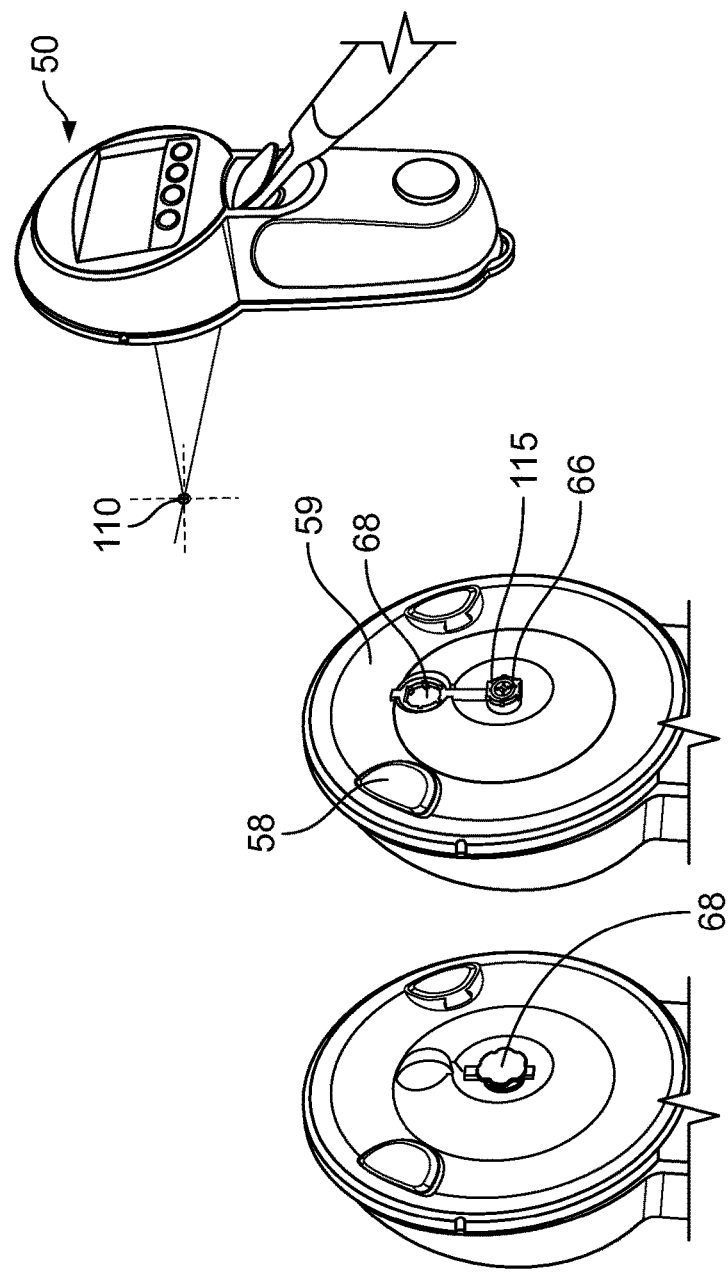
FIG. 13N depicts an exemplary embodiment of a surface tool in use.

FIG. 13N depicts an exemplary embodiment of a surface tool 50 in use. In one exemplary embodiment, marker system components include: replaceable, pre-inked rubber-stamp/marker 66 in plastic cartridge housing 115, and glide pads or feet 58, coupled to feet cavity 125 (FIG. 13M) with compressible foam backing. In one embodiment, when the marker system components are housed in a surface tool 50, aspects of the present invention allow an operator/user 75 of the surface tool 50 to mark the surface by applying pressure to the surface tool 50. Imbedded in the bottom surface of the scanner is a marker/stamp 66 which when brought in contact with the scanned surface leaves a mark 110. In one embodiment, the marker/stamp 66 is in the form of a cartridge 115 which can be attached to the bottom 59 of tool 50. In one embodiment, cartridge 115 attaches directly and reversibly, by means of a half turn thread, 180° rotation. In one embodiment, by applying extra pressure to the tool 50, against the scanned surface, the foam feet 58 of tool 50 are compressed allowing the marker/stamp 66 to make contact with that surface leaving a mark 110. If no marks are required during a scanning operation the stamp can be covered with an integrated cap 68 which snaps in place.

FIG. 13O depicts a side view of an exemplary embodiment of the present invention. FIG. 13O depicts an exemplary embodiment of tool 50, with front section 52, gripping means 53, underside/bottom 59, feet 58, marker 66, the engaging end of marker 66, and cartridge 115. In one embodiment, marker 66 and its engaging end 67 extend beyond underside/bottom 59 of tool 50. In one embodiment, marker 66 housed in cartridge 115, both extend beyond underside/bottom 59. In one embodiment, at least one foot 58 extends beyond the engaging end 67 of marker 66. In one embodiment, engaging end 67 of marker 66 extends beyond the opening of cartridge 115. In one embodiment, marker 66 is housed in cartridge 115.

Those skilled in the art can understand, the scope of the present invention is not limited by the name of tool 50, whether it be called "surface tool" or "surface marking tool" or "tool." In one embodiment, surface tool 50 has a pre-inked or non-pre-inked marker 66 within its underside which could leave a mark on a target surface when force is applied on the surface tool as described in these papers.

Figure 14:
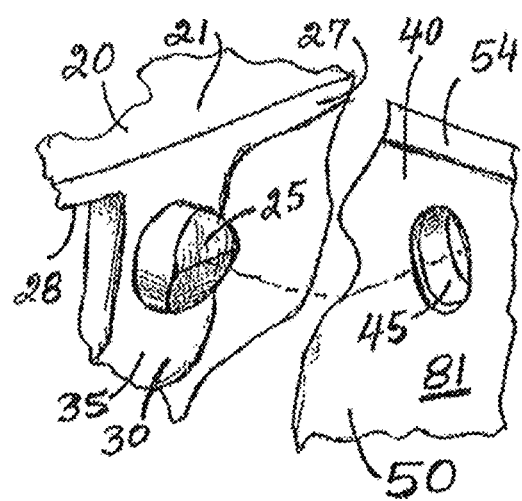
FIG. 14, depicts a side perspective view of an exemplary embodiment of a clip or hatch of the present invention and an exemplary embodiment of a cavity of an exemplary tool of the present invention.

FIG. 14, depicts a side perspective view of an embodiment of the present invention, depicting at least one axle 24, 25, of an exemplary hatch 20. In this exemplary embodiment, at least one axle 24, 25, is convex and is insertable into an exemplary portion or blind hole or female receiving means 45, within the cavity 40, of the tool 50, which would be designed to receive the axle 24, 25. In one embodiment the portion of the tool 50, designed to receive the axle 24, 25, may be located within the side wall 81, of the cavity 40, of the tool 50. In one embodiment, an exemplary member may be used to receive the axle 24, 25, and may be coupled to the periphery of the tool 50. In another embodiment, the receiving portion for the axle 24, 25, may be located anywhere on the tool 50.

FIG. 15, depicts usage of an exemplary embodiment of the present invention. In one embodiment of the present invention, a user 75, may use the inventive tool 23, to operate on a wall 74, or a ceiling 76, or on a floor 72, or use any other surface scanner 50, in a standing or seated position by using an exemplary handle 10, or an exemplary handle 10, coupled with at least one extending member 70, 80. In this exemplary embodiment, the tip 12, of the handle 10, after engagement with the exemplary hatch 20, operates as a lever to enable the tool 50, to be rotated 360° along the surface 72, 74, 76, in any direction by rotating the handle 10, as desired by the user 75. The tool or device 50, could be used to scan surface 72, 74, 76, for imbedded objects 95, such as, for example, wall stud 95, metal stud 95, wood stud 95, plastic stud 95, metal object 95, wooden object 95, plastic object 95, heat signature 95, electrical wiring 95, plumbing 95, other imbedded solids 95 or hidden components for delivering or transporting gases 95 and/or liquids 95, to name a few. The invention also allows for the standing or seated operation by the operator 75, or user 75, of a device 50, such as, a wall, ceiling, or floor scanner 50, and also allows the user 75, or operator 75, to extend his/her reach and control of the scanner 50. The scanner or device 50, can be held flat against the surface 72, 74, 76, to be scanned at a wide range of angles from the operator 75, or user 75. As stated earlier the orientation of the scanner or device 50, on the surface to be scanned 72, 74, 76, can be controlled by rotating the handle 10, 70, 80. Nevertheless, once tool 50 reaches the exact desired location, the user applies force to the exemplary handle and any extensions to the exemplary handle so that tool 50 is pressed against the wall surface, causing feet 58 to compress and marker 66 to engage with the surface, leaving a mark, such as, for example a star, or an "X" or any other symbol to indicate to the user that the actual position of the hidden or imbedded object or substance has been identified.

FIG. 16, depicts usage of an exemplary embodiment of the present invention. In an embodiment, the handle 10, is releasably coupled to the exemplary receiving member 20. In another embodiment the exemplary receiving member 20, here shown as an exemplary hatch 20, is releasably coupled to the tool 50. In one embodiment the exemplary handle 10, may be extended to receive at least one extending member 70, 80. In one embodiment, each extending member 70, 80, may be designed to receive additional extending members 70, 80, to further extend the reach of the tool 50. As shown in FIG. 16, the reach of the user 75, using a short or small handle 10, is only to radius R1, however, this reach can be easily extended to radius R2, by attaching an extension 70, to the handle 10, or to a radius which is still further away, such as, a radius R3, by either using a telescopic type extension 80, which is secured to handle 10, or multiple extensions 70, that are attached in series to form the extension 80. Therefore, as one can appreciate, the user 75, from the same location, can access greater distances for the tool 50, by using the handle 10, secured to the inventive receiving member 20. As stated earlier, the handle attachment 10, 70, 80, can be interchangeable to accommodate different desired total reach, such as, reach R1, reach R2, reach R3, to name a few. As one can appreciate, the user 75, can use this device 23, from a seated position, and also the user 75, does not need to go on his/her knees to scan a floor surface 72, or use a ladder to reach a ceiling surface 76, as the device 23 has a plurality of extensions 10, 70, 80 and ranges R1, R2, R3. Similarly, the device or tool 50, 23, can be reoriented from one location to another location 72, 74, 76, as desired by a user 75.

In the various exemplary embodiments discussed earlier, the exemplary hatch 20, is engageably and releasably coupled to the tool 50, to perform various functions. In the various exemplary embodiments, the tool 50, could be a surface scanner 50, used to determine the center-point of a wall stud (not shown). In the exemplary embodiments, the exemplary hatch 20, is preferably housed within a cavity 40, of the exemplary tool 50. In the exemplary embodiments, the hatch 20, is allowed to rotate about a vertical axis within the cavity 40, of the exemplary tool 50, by way of the axle 24, 25. In the exemplary embodiments, the hatch 20, preferably has at least one axle 24, 25, while the handle 10, preferably has at least one axle 13, 14, thus allowing the hatch 20, to rotate or move in a first rotational direction, and allowing the handle to rotate or move in a second rotational direction. For example, the first rotational direction could be an up-and-down movement, while the second rotational direction could be a side-to-side movement, or vice versa.

In the exemplary embodiments, when the handle 10, is engaged with the hatch 20, the tool 50, may be moved along a first axis, such as, a horizontal axis, or a vertical axis, while allowing a movement along a second axis, such as, a vertical axis, or a horizontal axis, when so desired by the user 75. In the exemplary embodiment, the tip 12, of the handle 10, after engagement with the hatch 20, creates a fulcrum and operates as a lever to enable the tool 50, to be rotated 360° along the surface 72, 74, 76.

The pole or handle 10, or extension pole 70, or telescopic pole 80, could preferably be made from a material selected from a group comprising plastic, polycarbonate, acrylonitrile butadiene styrene (ABS), composite material, metal, wood, and combinations thereof, to name a few.

The tools used in the present invention to locate the position of wall studs, including but not limited to metal, wood, and plastic studs, metal objects, wooden objects, heat signatures, electrical wiring, plumbing, and other imbedded solids or hidden components for delivering or transporting gases and/or liquids behind a surface such as, for example, the installed sheetrock or wallboard forming the wall surface, may be implemented on one or more computers executing software instructions. According to one embodiment of the present invention, the tools used may communicate with server 90, and client computer systems 90, that transmit and receive data over a computer network 91, or a fiber or copper-based telecommunications network 91 or through radio transmission or local area wireless technology that allows an electronic device to participate in computer networking using various radio bands. The steps of accessing, downloading, and manipulating the data, as well as other aspects of the present invention are implemented by central processing units (CPU) in the server 90, and client computers executing sequences of instructions stored in a memory 90. The memory may be a random access memory (RAM) 90, read-only memory (ROM) 90, a persistent store 90, such as a mass storage device 90, or any combination of these devices 90. Execution of the sequences of instructions causes the CPU 90, to perform steps according to embodiments of the present invention.

The instructions may be loaded into the memory of the server or client computers 90, from a storage device 90, or from one or more other computer systems 90, over a network connection 91. For example, a client computer 90, may transmit a sequence of instructions to the server computer 90, in response to a message transmitted to the client over a network 91, by the server 90. As the server 90, receives the instructions over the network connection 91, it stores the instructions in memory 90. The server 90, may store the instructions for later execution, or it may execute the instructions as they arrive over the network connection 91. In some cases, the CPU 90, may directly support the downloaded instructions. In other cases, the instructions may not be directly executable by the CPU 90, and may instead be executed by an interpreter that interprets the instructions. In other embodiments, hardwired circuitry may be used in place of, or in combination with, software instructions to implement the present invention. Thus tools used in the present invention are not limited to any specific combination of hardware circuitry and software, nor to any particular source for the instructions executed by the server or client computers 90. In some instances, the client and server functionality may be implemented on a single computer platform 90.

It should be appreciated that the inventive clip or hatch 20, can be quickly attached or detached from the tool 50, or the handle 10, 70, 80. Furthermore, the hatch 20, is configured in such a manner that under stress it would pop-out of the cavity 40, of the tool 20, or pop-out of the axles 13, 14, on the tip 12, of the handle 10, 70, 80, or vice versa. In another embodiment, a strap or other securing means would connect the handle to the tool so that if under stress the handle separates from the tool during operation, the tool will not fall and either break, hurt the user, or cause damage to person or property. Thus under stress none of the components 10, 20, 40, 50, would be damaged, and each component 10, 20, 40, 50 could be easily attached or detached, or assembled or reassembled, each from the other.

The embodiments of the present invention are described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein. Rather, the disclosed embodiments are provided so that this disclosure will be thorough and complete, and will fully convey the scope of the invention to those skilled in the art.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the inventions.

Still further, while certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the scope or spirit of the inventions.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

Thus, the present inventions are not limited to the embodiments described herein and the constituent elements of the invention can be modified in various manners without departing from the spirit and scope of the inventions. Various aspects of the inventions can also be extracted from any appropriate combination of a plurality of constituent elements disclosed in the embodiments. Some constituent elements may be deleted in all of the constituent elements disclosed in the embodiments. The constituent elements described in different embodiments may be combined arbitrarily.

What is claimed is:

1. A surface marking tool, comprising:
    a housing, said housing having an underside, and an upper section;
    a sensor coupled in the housing to identify a specific location on a surface;
    a marker having a back end and a marking end, whereby the back end is coupled to the underside of the housing and the marking end extends beyond the underside of the housing to engage with the target surface, wherein the marking end is capable of moving from a non-marking position to a marking position; and
    at least one pad coupled to the underside of the housing, and wherein said at least one pad extends beyond the underside of the housing, and wherein upon pressure on the at least one pad the marking end of the marker extends beyond the underside of the housing to engage with the target surface by moving from the non-marking position to the marking position.

2. The surface marking tool of claim 1, wherein the marker is pre-inked.

3. The surface marking tool of claim 1, wherein the marker is removably coupled to the underside of the housing.

4. The surface marking tool of claim 1, wherein the marker is removably housed in a blind hole within the underside of the housing.

5. The surface marking tool of claim 1, wherein at least one pad is compressible.

6. The surface marking tool of claim 1, wherein at least one pad is housed in a blind hole within the underside of the housing.

7. The surface marking tool of claim 1, wherein the marker has a removable cover to protect the marking end.

8. The surface marking tool of claim 1, wherein the at least one pad extends beyond the engaging end of the marker.

9. A surface marking tool, comprising:
  a housing, said housing having an underside, and an upper section;
  a sensor coupled in the housing to identify a specific location on a surface;
  a marker having a marking end, whereby the marker is housed in an open faced cartridge with a back end, whereby the marking end of the marker extends beyond the cartridge to engage with the target surface, wherein the marking end is capable of moving from a non-marking position to a marking position, and the back end of the cartridge is coupled to the underside of the housing and extends beyond the underside of the housing; and
  at least one pad coupled to the underside of the housing, and wherein said at least one pad extends beyond the underside of the housing, and wherein upon pressure on the at least one pad the marking end of the marker extends beyond the cartridge to engage with the target surface by moving from the non-marking position to the marking position.

10. The surface marking tool of claim 9, wherein the marker is removably housed in the cartridge.

11. The surface marking tool of claim 9, wherein the cartridge is removably coupled to the underside of the housing.

12. The surface marking tool of claim 9, wherein the cartridge is removably housed in a blind hole within the underside of the housing.

13. The surface marking tool of claim 9, wherein at least one pad is compressible.

14. The surface marking tool of claim 9, wherein at least one pad is housed in a blind hole within the underside of the housing.

15. The surface marking tool of claim 9, wherein the at least one pad extends beyond the engaging end of the marker.

16. The surface marking tool of claim 9, wherein at least one pad is coupled to at least one substrate that permits compression.

17. A method of using a surface marking tool, comprising the steps of:
  positioning the surface marking tool having at least one pad, and a marker having a marking end against a target surface, wherein the marking end is capable of moving from a non-marking position to a marking position, and wherein said surface marking tool has an underside, and an upper section, and wherein said at least one pad and said marking end extends beyond the underside of said surface marking tool;
  using a sensor coupled in a housing to identify a specific location on the target surface; and
  applying force onto the at least one pad of the surface marking tool against the target surface; and
  causing the at least one pad to compress and causing the marking end of the marker housed within the underside of said surface marking tool to engage with the target surface and leave a mark, by moving from the non-marking position to the marking position.

18. The method of claim 17, further comprising the step of detecting a hidden object behind the target surface and indicating to an operator the detection of the hidden object.

19. The method of claim 17, further comprising the step of using a handle attachment that removably couples to an upper section of the housing to mark the target surface.

20. The method of claim 17, further comprising the step of using one or more extensions that removably couple to a handle attachment to mark the target surface.

* * * * *